US010043216B2

(12) United States Patent
Padilla et al.

(10) Patent No.: US 10,043,216 B2
(45) Date of Patent: Aug. 7, 2018

(54) 3-D GRAPHICAL VISUALIZATION OF DIVERSIFICATION OF PORTFOLIO HOLDINGS

(71) Applicant: The Vanguard Group, Inc., Malvern, PA (US)

(72) Inventors: Michael R. Padilla, Phoenixville, PA (US); John E. Buhl, Wayne, PA (US)

(73) Assignee: The Vanguard Group, Inc., Malvern, PA (US)

( * ) Notice: Subject to any disclaimer, the term of this patent is extended or adjusted under 35 U.S.C. 154(b) by 0 days.

(21) Appl. No.: 14/219,975

(22) Filed: Mar. 19, 2014

(65) Prior Publication Data

US 2015/0269679 A1 Sep. 24, 2015

(51) Int. Cl.
*G06Q 40/00* (2012.01)
*G06Q 40/06* (2012.01)

(52) U.S. Cl.
CPC .................................. *G06Q 40/06* (2013.01)

(58) Field of Classification Search
CPC ...................................................... G06Q 40/06
See application file for complete search history.

(56) References Cited

U.S. PATENT DOCUMENTS

| | | | |
|---|---|---|---|
| 6,583,794 B1* | 6/2003 | Wattenberg | G06F 17/30994 707/999.102 |
| 7,472,084 B2 | 12/2008 | Damschroder | |
| 7,890,406 B2 | 2/2011 | Markov et al. | |
| 2003/0208427 A1* | 11/2003 | Peters et al. | 705/36 |
| 2003/0208432 A1* | 11/2003 | Wallman | 705/36 |
| 2003/0212621 A1* | 11/2003 | Poulter | G06Q 40/06 705/36 R |
| 2008/0243716 A1 | 10/2008 | Ouimet et al. | |
| 2012/0254067 A1* | 10/2012 | Litman | G06Q 40/00 705/36 R |
| 2012/0265708 A1* | 10/2012 | Gardner | G06Q 40/00 705/36 R |
| 2012/0296848 A1* | 11/2012 | Villacorta | G06Q 40/025 705/36 R |

OTHER PUBLICATIONS

Webopedia ("drag-and-drop" Quinstreet Enterprise http://webopedia.com/TERM/D/drag_and_drop.html Jan. 1, 2007).*

(Continued)

*Primary Examiner* — Bruce I Ebersman
*Assistant Examiner* — Mark H Gaw
(74) *Attorney, Agent, or Firm* — Panitch Schwarze Belisario & Nadel LLP

(57) ABSTRACT

Data visualization processes are provided for expressing diversification of an investment based on each underlying holding weight in the investment relative to each holding's market capitalization weight in the investment and each holding's market capitalization weight in the broad market or by its absolute holding percentage. Visualizations can be depicted in both 2-D and 3-D formats, with area fill, volume fill, color, and/or opacity depicting percentage of coverage. Visualization can show diversification down to the individual holding level and in aggregate levels, such as mega-cap, mid-cap and small-cap.

18 Claims, 41 Drawing Sheets
(31 of 41 Drawing Sheet(s) Filed in Color)

(56) References Cited

OTHER PUBLICATIONS

Page, John ("Cube", http://web.archive.org/web/20081216054433/http://www.mathopenref.com/cube.html, Math Open Reference, Dec. 16, 2008).*

Ben Shneiderman, "Ordered Treemap Layouts." Proceedings of the IEEE Symposium on Information Visualization (INFOVIS'01), Oct. 22-23, 2001, 6 pages.

Wikipedia entry for "Treemapping." Printout from web page: http://www.opengl.org/wiki_132/index.php?title=Shader&printable=yes Printout date: Feb. 7, 2014, page last modified Jan. 15, 2014, 5 pages.

Wikipedia entry for "Shader." Printout from web page: http://en.wikipedia.org/w/index.php?title=Treemapping&printable=yes Printout date: Jan. 20, 2014, page last modified Aug. 31, 2013, 4 pages.

* cited by examiner

Total Stock Market Index Fund, each holding plotted, largest (top left) to smallest (bottom right).

Figure 1C
Linearly wrapping positioning: ordering schema with largest company by market capitalization (top left) to smallest company by market capitalization (bottom right).

Figure 1D
Diagonal wrapping positioning: Ordering schema with largest company by market capitalization (top left) to smallest company by market capitalization (bottom right).

Vanguard Mid-Cap Index Fund

Total Stock Market Index, each holding plotted, largest (top left) to smallest (bottom right). Each holding box is sized proportionally to its market cap. Colored based on the funds holding percentage relative to market cap. White – 0%, blue (shade shown about) 100%, blue to red (red max overweight for the fund).

Windsor Fund

Windsor Fund, top left section enlarged

Total Stock Market Index Fund, all holdings grouped into mega-cap, mid-cap, and small-cap holdings.

500 Index Fund

Small-Cap Value Index Fund

Selected Value Fund

Nine Vanguard stock mutual funds with holding percentage value plotted in 3d

| Total Stock Mkt Idx Inv | Large-Cap Index Fund Inv | 500 Index Fund Inv |
|---|---|---|
| Growth and Income Inv | Value Index Fund Inv | FTSE Social Index Inv |
| Growth Index Fund Inv | High Dividend Yld Idx Inv | Morgan Growth Fund Inv |

Figure 9B-1
Name key for funds shown in Figures 9A, 10, 11, and 14-18.

| Strategic Equity Fund | Explorer Fund Investor | Mid-Cap Value Index Inv |
|---|---|---|
| Mid-Cap Growth Index Inv | Small-Cap Value Index | Small-Cap Growth Idx Inv |
| Mid-Cap Growth Fund | Strategic Sm-Cap Equity | Selected Value Fund |

Figure 9B-2
Name key for funds shown in Figure 12.

| Extended Mkt Index Inv | Dividend Apprec Idx Inv | Mid-Cap Index Fund Inv |
|---|---|---|
| Capital Value Fund | Capital Opportunity Inv | Small-Cap Index Fund Inv |
| Strategic Equity Fund | Explorer Fund Investor | Mid-Cap Value Index Inv |

Figure 9B-3
Name key for funds shown in Figure 13.

Vanguard Total Stock Market fund with holding percentage value plotted in 3d.

Vanguard Total Stock Market fund with holding percentage value plotted in 3d – not weighted by market cap. Each holding is colored by Value (orange) or Growth (red).

Vanguard Mid-Cap Index fund with holding percentage value plotted in 3d.

Vanguard Mid-Cap Value Index fund with holding percentage value plotted in 3d.

Vanguard Small-Cap Index fund with holding percentage value plotted in 3d.

Vanguard Windsor fund with holding percentage value plotted in 3d.

Zoom-in view of the Vanguard Total Stock Market fund with holding percentage value plotted in 3d
Holdings are positioned as described in Fig 1b. Stock tickers are displayed on each holding.

Diversification visualization for investments across multiple investors, grouped by holding segment.

Diversification visualization for investments across multiple investors, displayed by individual holdings of investors' portfolio.

Ten mutual funds printed using 3D printing technology

Six mutual funds printed using 3D laser crystal etching technology

Data structure

| Unique Asset Name | Weight % | Size | Type |
|---|---|---|---|
| "Asset 1" | 4.0 | "mega" | "growth" |
| "Asset 2" | 3.8 | "mega" | "value" |
| "Asset 3" | 3.5 | "mid" | "growth" |
| "Asset 4" | 1.2 | "small" | "growthAndValue" |

Figure 21

Example fund data subset for Total Stock Market Fund:

|  | Holding | % of fund |
|---|---|---|
| 1 | APPLE INC | 2.513 |
| 2 | EXXON MOBIL CORP | 2.131 |
| 3 | MICROSOFT CORP | 1.38 |
| 4 | JOHNSON | 1.334 |
| 5 | GENERAL ELECTRIC | 1.315 |
| 6 | CHEVRON CORP | 1.283 |
| 7 | GOOGLE INC-CL A | 1.262 |
| 8 | WELLS FARGO & CO | 1.196 |
| 9 | PROCTER & GAMBLE | 1.174 |
| 10 | IBM | 1.111 |
| 11 | JPMORGAN CHASE | 1.05 |
| 12 | PFIZER INC | 1.037 |
| 13 | BERKSHIRE HATH-B | 1.014 |
| 14 | AT&T INC | 1.001 |
| 15 | COCA-COLA CO/THE | 0.841 |
| 16 | BANK OF AMERICA | 0.837 |
| 17 | MERCK & CO | 0.785 |
| 18 | CITIGROUP INC | 0.768 |
| 19 | VERIZON COMMUNIC | 0.745 |
| 20 | PHILIP MORRIS IN | 0.713 |
| 21 | CISCO SYSTEMS | 0.685 |
| 22 | PEPSICO INC | 0.678 |
| 23 | WAL-MART STORES | 0.657 |
| 24 | QUALCOMM INC | 0.63 |
| 25 | ORACLE CORP | 0.619 |
| 26 | INTEL CORP | 0.601 |
| 27 | HOME DEPOT INC | 0.598 |
| 28 | SCHLUMBERGER LTD | 0.592 |
| 29 | AMAZON.COM INC | 0.563 |
| 30 | WALT DISNEY CO | 0.542 |
| 31 | COMCAST CORP-A | 0.53 |
| ... | | |
| 2866 | AMYRIS INC | 0.001 |
| 2867 | IMPERIAL HOLDING | 0.001 |
| 2868 | QUICKLOGIC CORP | 0.001 |
| 2869 | CENTURY BANC -A | 0.001 |
| 2870 | INTERMOLECULAR I | 0.001 |
| 2871 | INDEP HLDG CO | 0.001 |
| 2872 | MANITEX INTERNAT | 0.001 |
| 2873 | ACORN ENERGY INC | 0.001 |

Figure 25

$$\text{overlapCandidateWeight}_j = \sum_{i=1}^{n} w'''_{j,i}, \quad \text{where } w'''_{j,i} = \begin{cases} \min\{w_{j,i}, w_{total,i}\}, & w_{j,i} > 0, w_{source,i} > 0 \\ 0, & \& \text{ else} \end{cases}$$

Figure 27

$$\alpha_j = 0.5 \times \left( \alpha'_{j,1} \times \left(1 - \text{overlapSourceWeight}_j\right) + \alpha'_{j,1} \times \left(1 - \text{overlapCandidateWeight}_j\right) + \alpha'_{j,2} \times \left(\text{overlapSourceWeight}_j + \text{overlapCandidateWeight}_j\right) \right)$$

Figure 28

3-D GRAPHICAL VISUALIZATION OF DIVERSIFICATION OF PORTFOLIO HOLDINGS

BACKGROUND OF THE INVENTION

Diversification is a risk management technique that mixes a wide variety of investments within a portfolio. A portfolio of different kinds of investments will, on average, yield higher returns and pose a lower risk than any individual investment found within the portfolio. Stated simply, diversification is a key aspect to maximizing long-term returns on investments. Investing in mutual funds automatically ensures some level of diversification, as opposed to selecting and holding a few individual securities, because a mutual fund typically holds a large number of securities. However, most mutual funds focus on very specific market segments (e.g., large cap stocks, small cap stocks, value stocks, growth stocks, real estate), and thus are inherently not diverse in certain aspects. There are some mutual funds that attempt to mimic the broad market, such as the Vanguard Total Stock Market Index fund, and thus inherently provide a high degree of diversification, at least with respect to stocks. However, most investors own a variety of different mutual funds and other investments which have holdings that are not inherently diverse.

It is a very difficult and time-consuming task to quantitatively determine how diverse a portfolio of investments is. However, this type of information is important to know, especially when building investment portfolios, or when buying and selling individual holdings, or when rebalancing a portfolio. Oftentimes, this type of information is communicated to users in formats that are difficult to read and comprehend. The present invention addresses this issue by providing 2-D and 3-D graphical visualizations of portfolio holdings which instantly communicate the diversification level of the holdings to the user in easy to digest formats.

BRIEF SUMMARY OF THE INVENTION

Data visualization methods and apparatus are provided for expressing diversification of an investment based on each underlying holding weight in the investment relative to each holding's market capitalization weight in the investment and each holding's market capitalization weight in the broad market or by its absolute holding percentage. An "investment" can be a single investment (e.g., a single stock or bond), a single mutual fund, or an entire portfolio of investments.

The visualization expresses diversification as a part-to-whole comparison, in which the whole is defined as a broad market (e.g., CRSP U.S. Broad Market Index), also referred to herein as a "universe of securities." In one preferred embodiment, the universe of securities includes close to 100% of the cumulative full market capitalization of the U.S. equity universe. In another preferred embodiment, the visualization may be of International Stock investments, in which case the "universe of securities" would be FTSE Global All Cap ex US Index. In other embodiments, there may be a universes of securities for Domestic Bonds and International Bonds.

Visualizations can be depicted in both 2-D (2D) and 3-D (3D) formats, with area fill, volume fill, color, and/or opacity depicting percentage of coverage. Visualization can show diversification down to the individual holding level and in aggregate levels (e.g., mega-cap, mid-cap, small-cap). Secondary dimension such as value/growth and sector can also be visualized.

Diversification is a fundamental investment principle that describes how risk can be spread across multiple holdings to avoid the extreme highs and lows of individual holdings. Specifically, broad diversification based on market capitalization prescribes an investment philosophy by which an investor should essentially own the entire market by owning every underlying holding in a broad market (e.g., every publicly traded company in the U.S.) in proportion to its size as determined by its market capitalization (number of outstanding shares multiplied by its publicly traded share price). For example, for every $100 that an investor has invested in the US Stock Market, $2.51 should be invested in Apple Inc., because Apple Inc. comprises 2.51% of the US Stock Market as measured by market capitalization.

The visualization of the size of the broad market (number of holdings in the "whole"), which holdings an investment has in the broad market, the extent that an investment includes holdings relative to their broad market capitalization, and optionally the size of each holding to confer relative importance, can help investors better understand to what extent an investment provides diversification across a broad market.

BRIEF DESCRIPTION OF THE DRAWINGS

Preferred embodiments of the present invention will now be described by way of example with reference to the accompanying drawings.

The application file contains at least one drawing executed in color. Copies of this patent application with color drawing(s) will be provided by the Office upon request and payment of the necessary fee. The color drawings are FIGS. 1A, 1B, 2, 3, 4A-4B, 5-8, 9A, 9C-9I, 10-18, 19A-19B and 20A-20B.

FIGS. 1A-1D, 2, 3 and 4A-4B illustrate 2D graphical visualizations of the diversification of portfolio holdings in accordance with preferred embodiments of the present invention.

FIG. 9B-1 is a name key for funds shown in FIGS. 9A, 10, 11 and 14-18.

FIG. 9B-2 is a name key for funds shown in FIG. 12.

FIG. 9B-3 is a name key for funds shown in FIG. 13.

FIGS. 9C-9I, 10-18, 19A-19B and 20A-20B also illustrate 3D graphical visualizations of the diversification of portfolio holdings in accordance with preferred embodiments of the present invention.

FIG. 21 is a sample data structure for use in preferred embodiments of the present invention.

FIG. 25 is a sample fund data subset for use in preferred embodiments of the present invention.

FIGS. 27 and 28 are equations which are used for preferred embodiments of the present invention.

DETAILED DESCRIPTION OF THE INVENTION

Certain terminology is used herein for convenience only and is not to be taken as a limitation on the present invention.

Various Vanguard funds are referred to throughout the specification. These funds are merely exemplary funds for illustrating preferred embodiments of the present invention. The present invention is not limited to using Vanguard funds.

I. Acronyms/Abbreviations

Figure 1A:
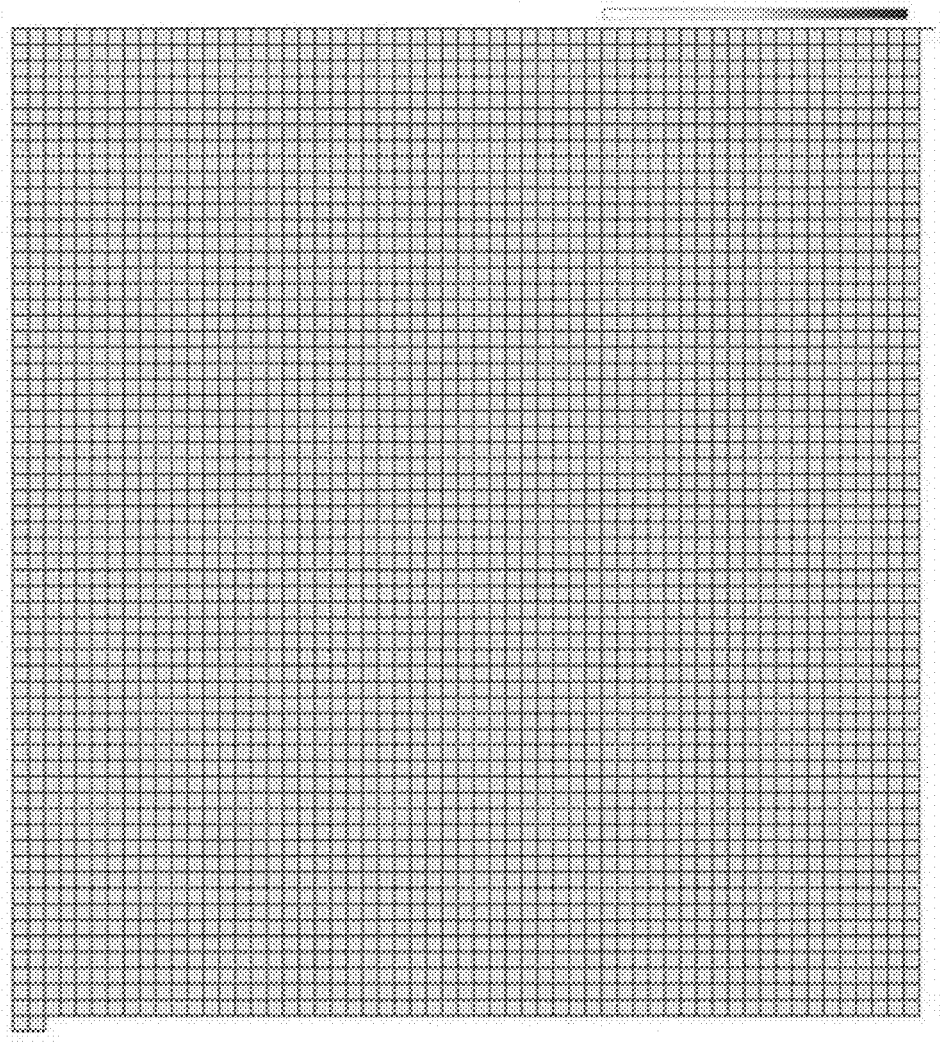

CRSP: Center for Research in Security Prices
FTSE: Financial Times Stock Exchange II. 2D Visual Representations The degree of diversification can vary greatly between different investments (e.g., mutual funds). As an example, the Vanguard Total Stock Market fund (FIG. 1A) provides nearly 100% coverage of the U.S. stock market. FIG. 1A depicts this coverage by showing that nearly every unit (each unit in the grid represents a company of the US Stock Market) is shaded (indicating that the fund contains that particular holding) and that the fund owns each holding in the same proportion as it is valued in the U.S. stock market as measured by its market capitalization (indicated by the color used to shade the unit).

Figure 1B:
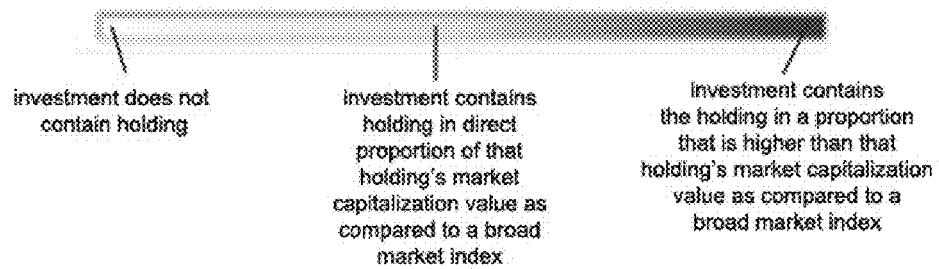

FIG. 1B illustrates and describes the color spectrum used to shade grid units to reflect the degree by which an investment (e.g., mutual fund) is invested in a particular holding as compared to that investments market capitalization value. Here, the color spectrum goes from white to different shades of blue to different shades of red, wherein pure white indicates that the investment does not contain holdings (i.e., zero holdings), a medium blue shade indicates that the investment contains holdings in direct proportion of the market capitalization of the holding as compared to the broad market index, and a solid red indicates that the investment contains holdings in a proportion that is higher than the market capitalization of the holding as compared to the broad market index.

Figure 2:
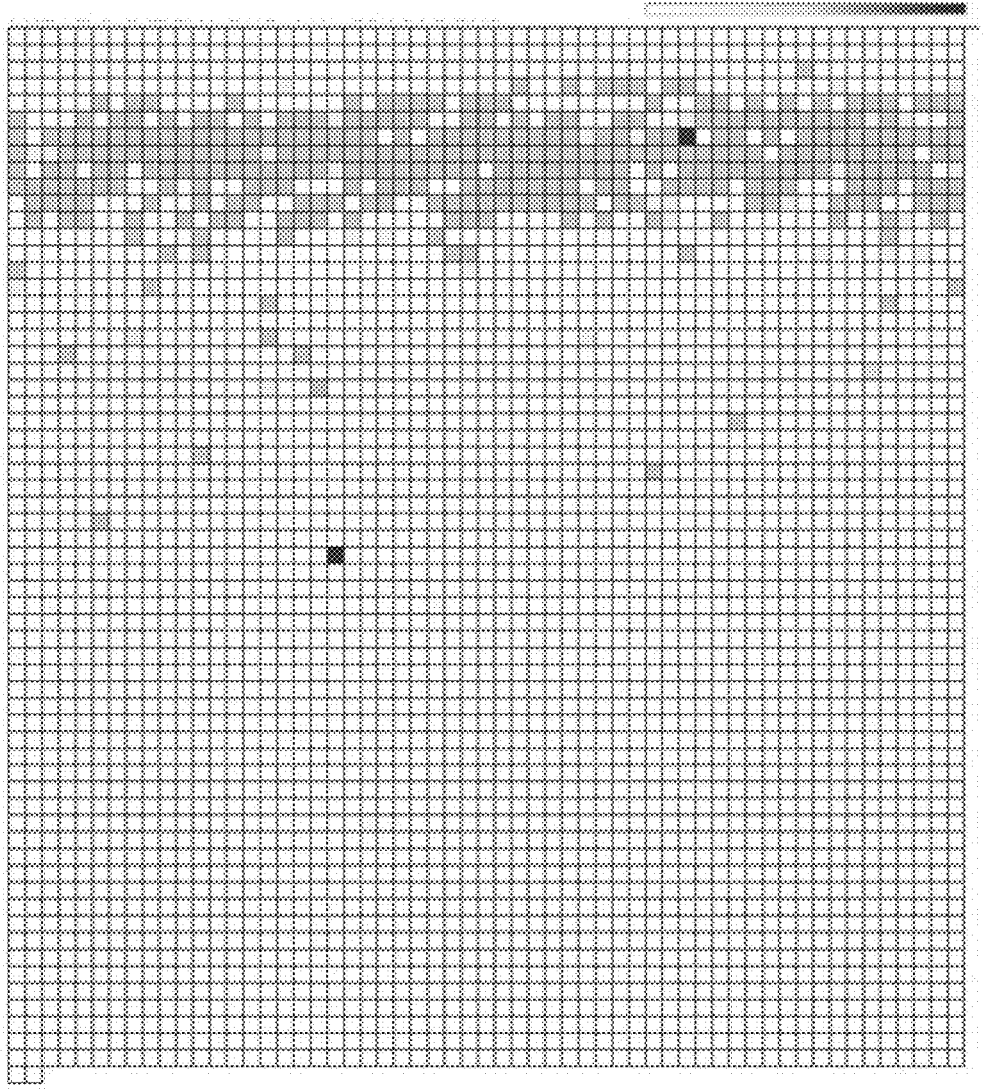

FIG. 2 is a 2D visual representation of the Vanguard Mid-Cap Index Fund. This fund aims to give full coverage of mid-cap holdings and consequently does not provide significant coverage across mega-cap companies or small-cap companies, as clearly depicted by the large areas of pure white.

Figure 3:
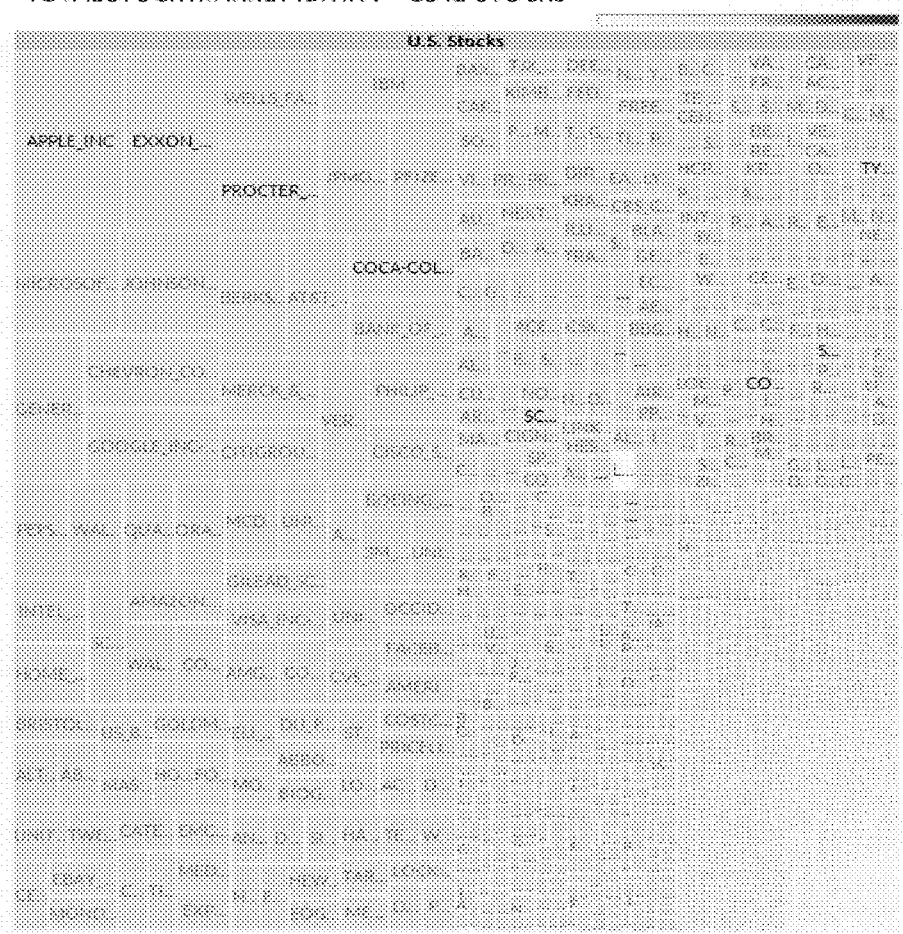

FIG. 3 is a 2D visual representation of the Vanguard Total Stock Market fund with nearly the entire grid being shaded, but in this grid, the units are sized in proportion to their corresponding market capitalization holdings. When presented in this manner, the area that is colored directly reflects the relative amount of the broad market that the fund covers. In FIG. 3, each holding is plotted from largest (top left) to smallest (bottom right).

Figure 4A:
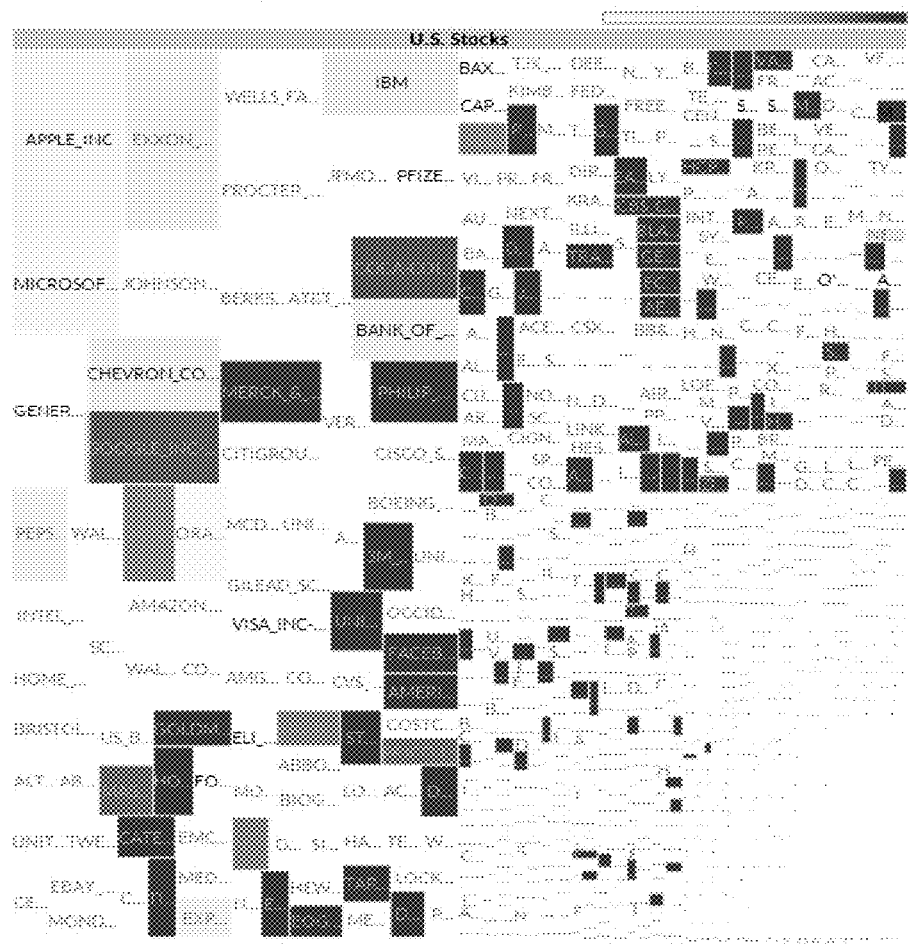
Figure 4B:

FIG. 4A is a 2D visual representation of the Vanguard Windsor Fund. This fund is an actively managed fund and does not aim to hold holdings that represent the broad market. Instead, investment managers actively select a unique subset of holdings and invest in them disproportionately as compared to their market capitalization values. FIG. 4B shows an enlarged view of the top left section of FIG. 4A.

FIG. 1A and FIG. 2 use linearly wrapping positions. FIG. 3 and FIG. 4A use traditional tree-map visualization positioning—"squarified," as described in "Ben Shneiderman et al., Ordered Treemap Layouts, Proceedings of the IEEE Symposium on Information Visualization 2001 (INFO-VIS'01), Oct. 22-23, 2001.

The grid described above and depicted in the figures is thus a two-dimensional array of elements (e.g., boxes), wherein each element represents a security in the universe of securities. The securities are located in the elements ordered by relative market capitalization. The color spectrum described above defines a palette of colors or shades, each color or shade representing a percentage range of a holding relative to market capitalization, thereby identifying proportionally underweighted, equally weighted and overweighted holdings relative to market capitalization. While the presently disclosed color spectrum uses different shades of white, blue and red, other palettes of colors or shades may be used.

III. 3D Visual Representations

Investment diversification can also be visualized by grouping holdings into segments, such as mega-cap holdings, mid-cap holdings, and small-cap holdings, and displaying the aggregate diversification provided by the cumulative coverage that the constituent holdings provide within each segment.

A. Cube View

Figure 5:
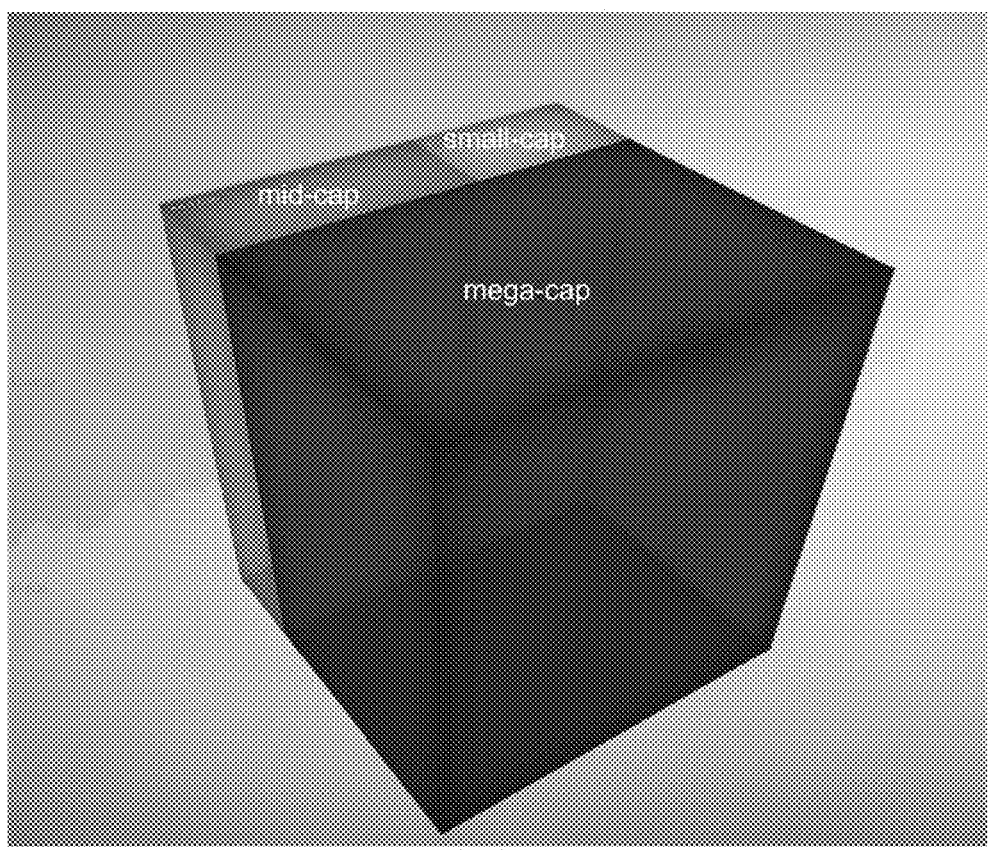
FIGS. 5-8 and 9A illustrate 3D graphical visualizations of the diversification of portfolio holdings in accordance with preferred embodiments of the present invention.

FIG. 5 shows the Vanguard Total Stock Market fund visualized in this manner. Each segments footprint area is relative to the segment's market capitalization in the broad market (for example, mega-cap segment represents 70% of the broad market capitalization, mid-cap segment represent 15% of the broad market capitalization, and small-cap segment represent 15% of the broad market capitalization—each segments area is sized by these proportions accordingly). In this visualization, individual holding detail is not shown. Instead, holdings are grouped and "blended" into categories of mega-cap, mid-cap, and small-cap companies. That is, holdings are grouped by small-cap, mid-cap, and mega-cap and fill the cube volume based on their broad market capitalization. (The small-cap volume include micro-cap holdings.) The near complete diversification that the Vanguard Total Stock Market fund provides is shown in this view as a 3D cube being nearly entirely filled. Other potential holding segments could be based on other dimensions, including, but not limited to, sector (e.g., energy, financials) and investment style (e.g., value and growth).

Figure 6:
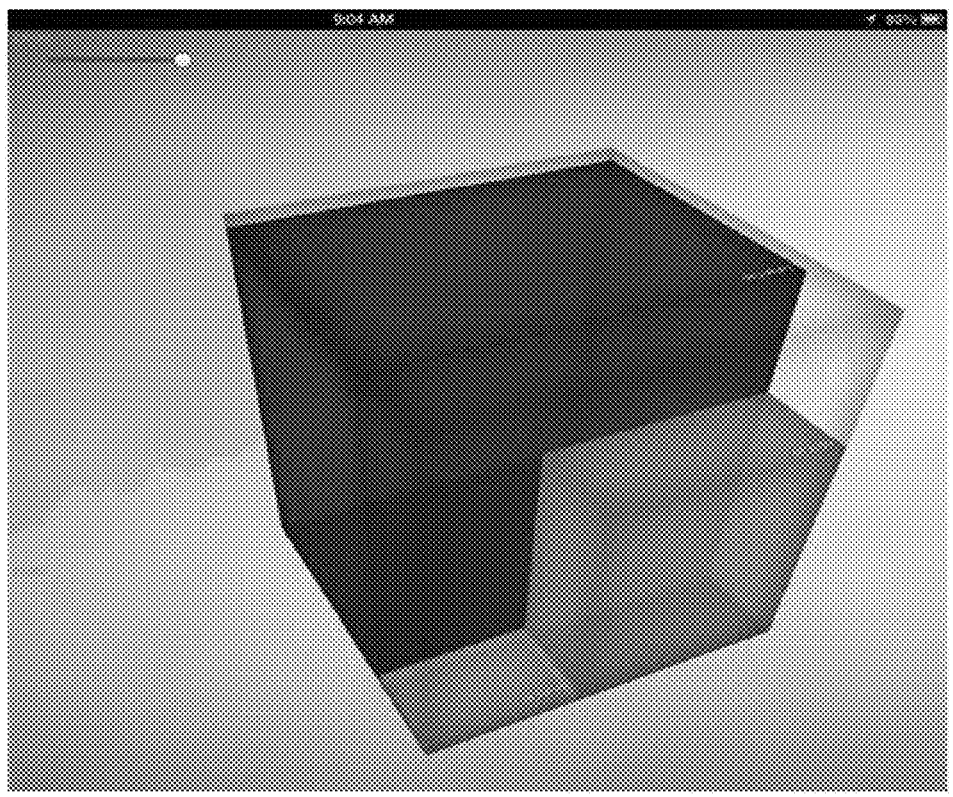

FIG. 6 shows the Vanguard 500 Index Fund visualized in a similar manner. This fund generally owns the 500 largest companies in the U.S. stock market, resulting in nearly full market capitalization based coverage of mega-cap stocks, rough ⅔ market capitalization based coverage of mid-cap stocks, and a small fraction of market capitalization based coverage for small-cap stocks. Accordingly, most of the space in the cube portion attributed to small-cap stocks is unfilled.

Figure 7:
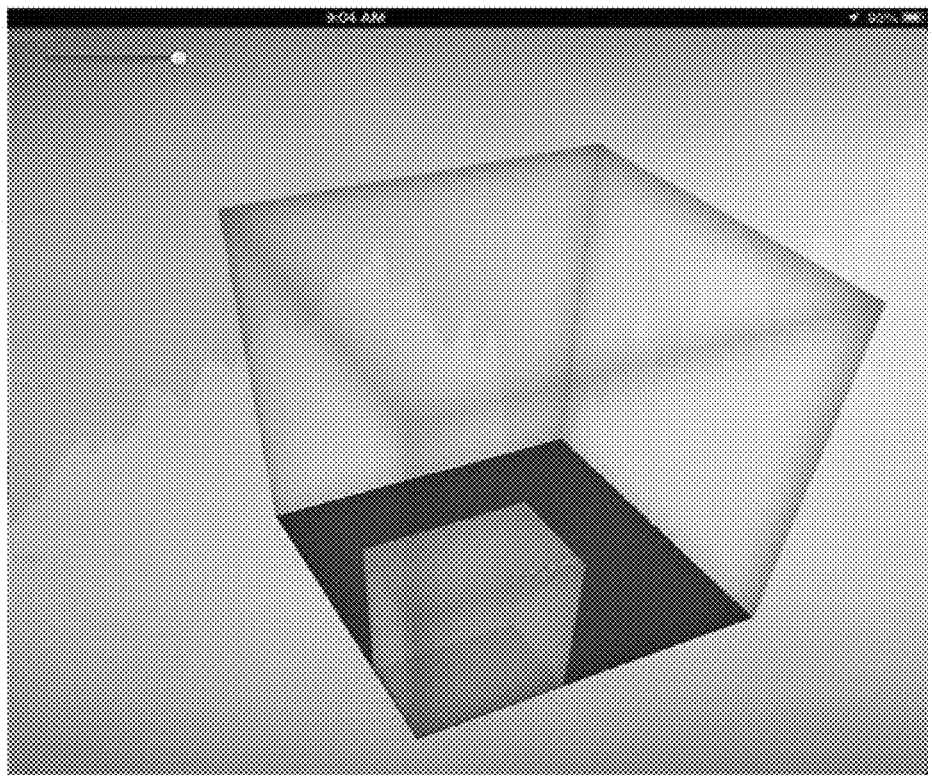

FIG. 7 shows the Vanguard Small-Cap Index Fund visualized in a similar manner. The Small-Cap Value Index Fund only owns small-cap companies that are designated as "value" companies, resulting in roughly 50% coverage of small-cap stocks, as indicated by the yellow small-cap bar at roughly 50% the height of the cube. The remaining empty small-cap volume represents the small-cap growth holdings that this fund does not hold.

Figure 8:
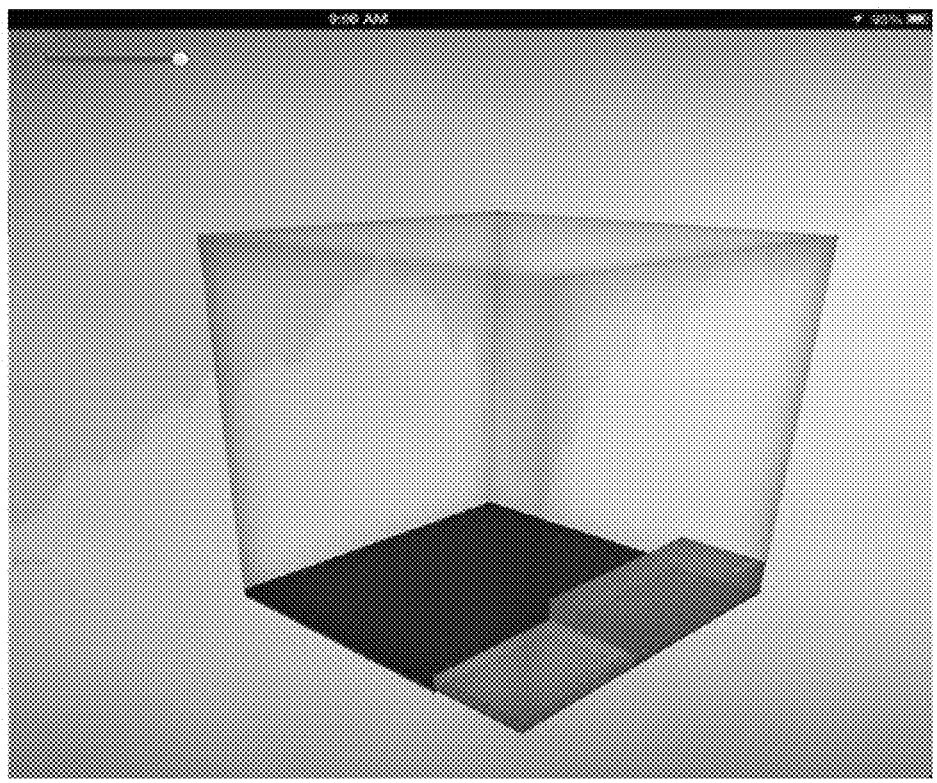

FIG. 8 shows the Vanguard Selected Value Fund visualized in a similar manner. This fund is an actively managed fund and does not aim to hold holdings that represent the broad market. Instead, investment managers actively select a unique subset of holdings and invest in them disproportionately as compared to their market capitalization values, resulting in a low level of diversification.

B. Flyover View

An investment can also be rendered in 3D by plotting each underlying holding's absolute percentage weight (not the relative coverage as calculated by comparing to each holdings broad market capitalization) as the extruded heights for each holding. For such a rendering, a common positioning schema is used so that common comparisons can be made across investments. In the figures shown below, holdings are positioned as described in FIG. 1D.

Figure 9A:
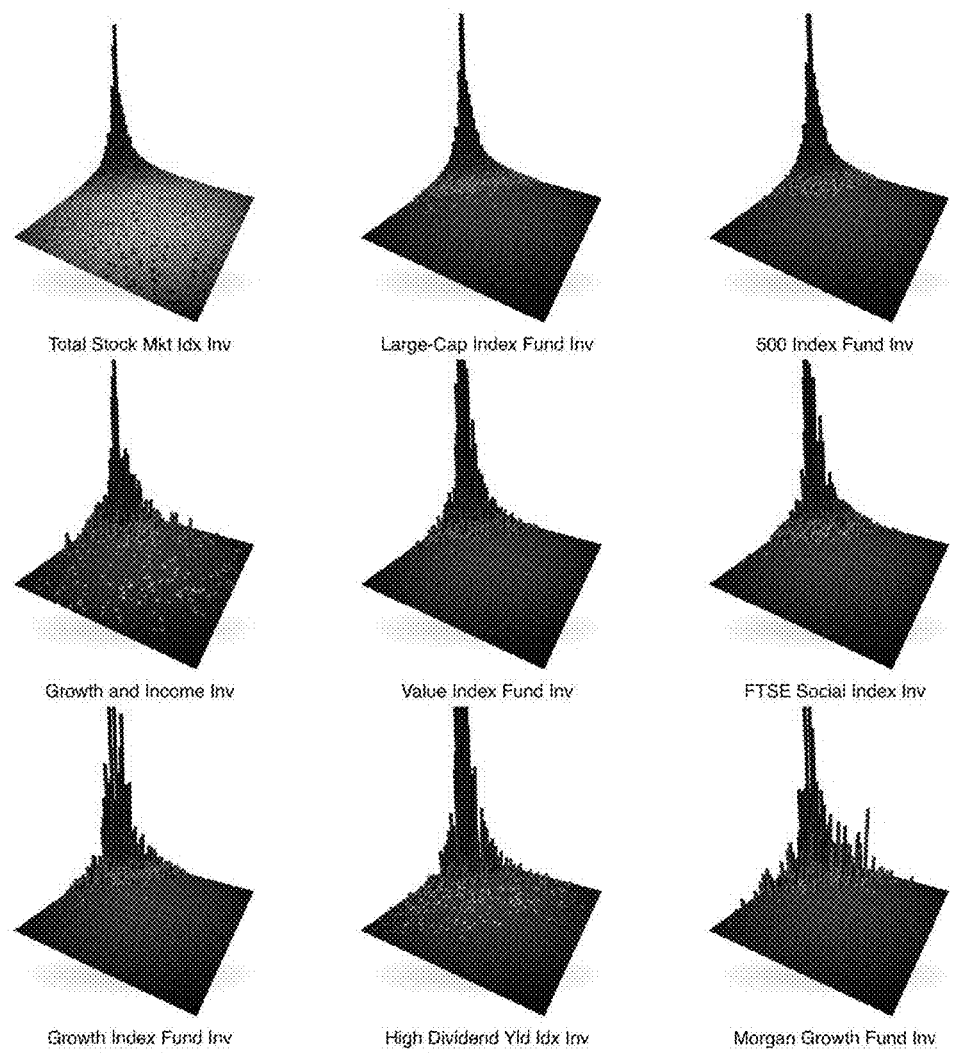
Figure 9C:
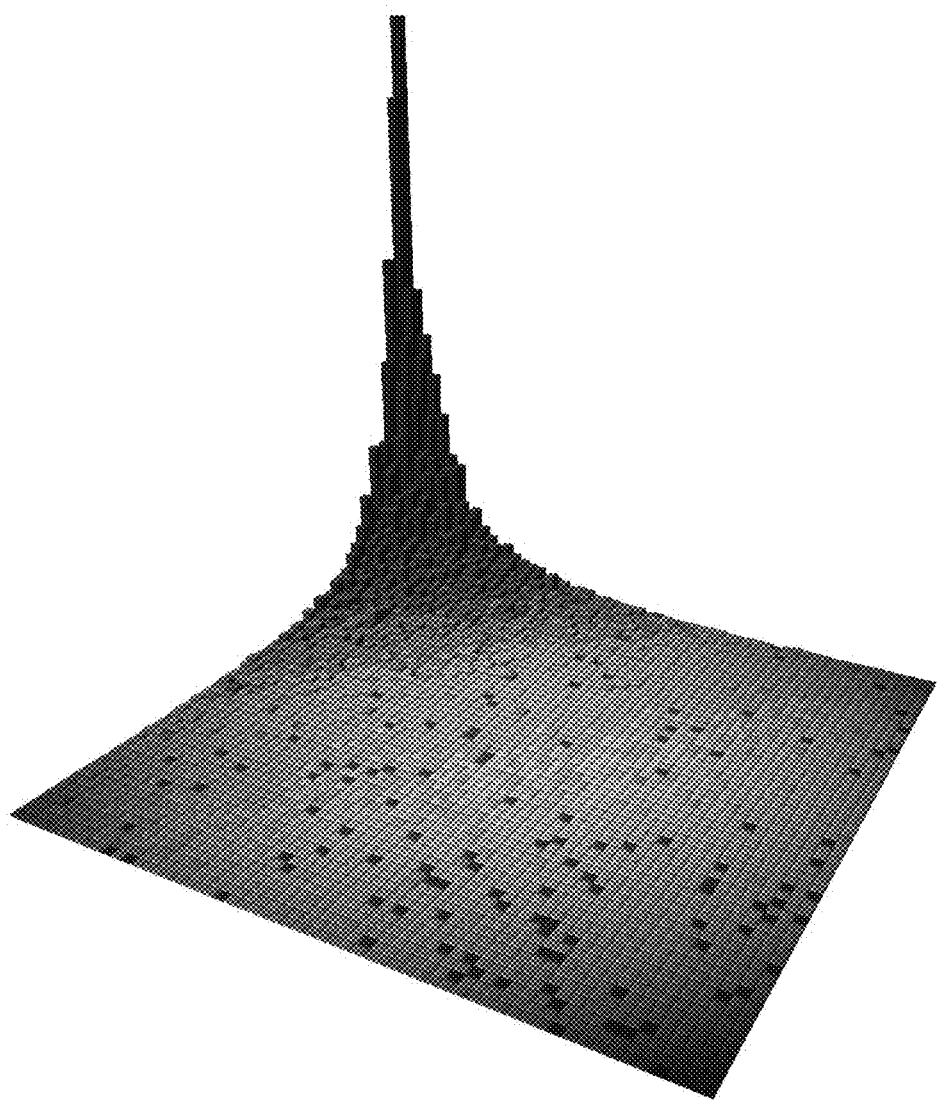

FIG. 9A shows nine different Vanguard mutual funds visualized in a similar manner. As noted above, the holding percentage values are not weighted by market cap. Each holding is colored by market cap group—mega (red), mid-cap (orange), small-cap (yellow), and micro-cap (light yellow). FIG. 9B is a name key that shows an enlarged view of the fund names of FIG. 9A. (The name key is also used for other figures discussed below.) FIG. 9C is an enlarged view of the Vanguard Total Stock Market fund shown in the upper lefthand corner of FIG. 9A. Although nine different funds are shown in the figures, any number of funds may be shown based on the display screen resolution and available real estate. In one example (not illustrated), 34 different Vanguard mutual funds are shown.

Figure 9D:
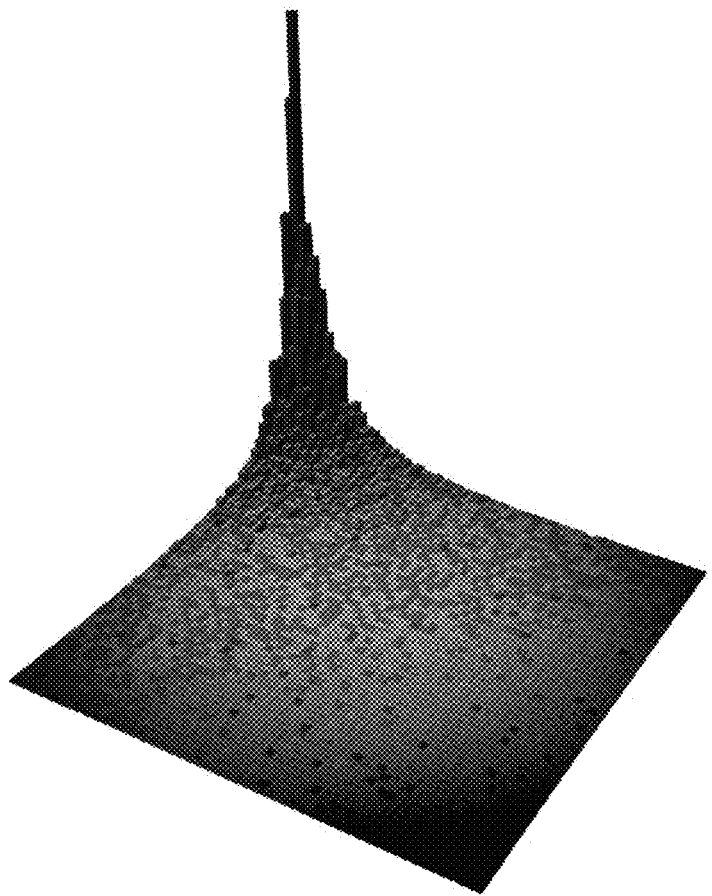

FIG. 9D shows the Vanguard Total Stock Market fund with the holding percentage value plotted in 3D, again, not weighted by market cap. In this figure, each holding is colored by Value (orange) or Growth (red). Micro-cap holdings are not able to be classified as either Value or Growth (light grey).

Figure 9E:
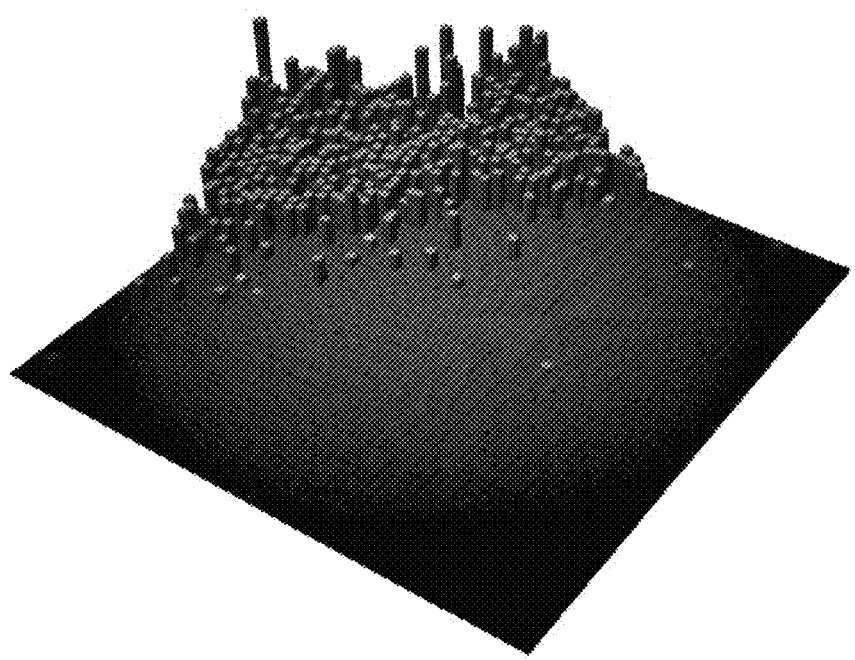
Figure 9F:
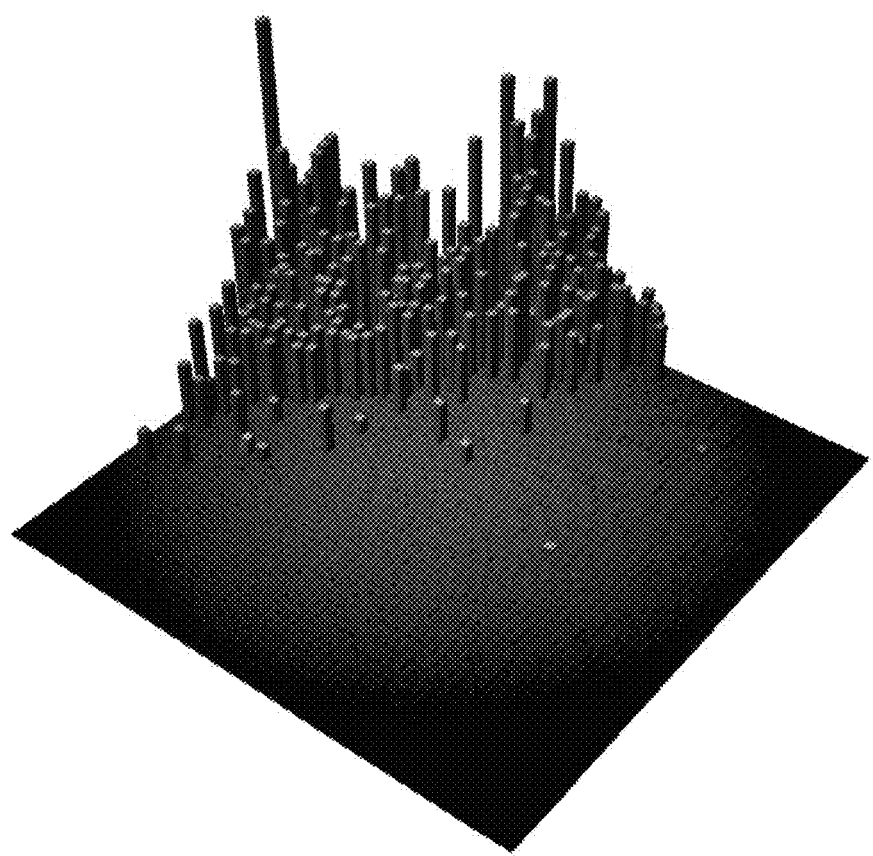
Figure 9G:
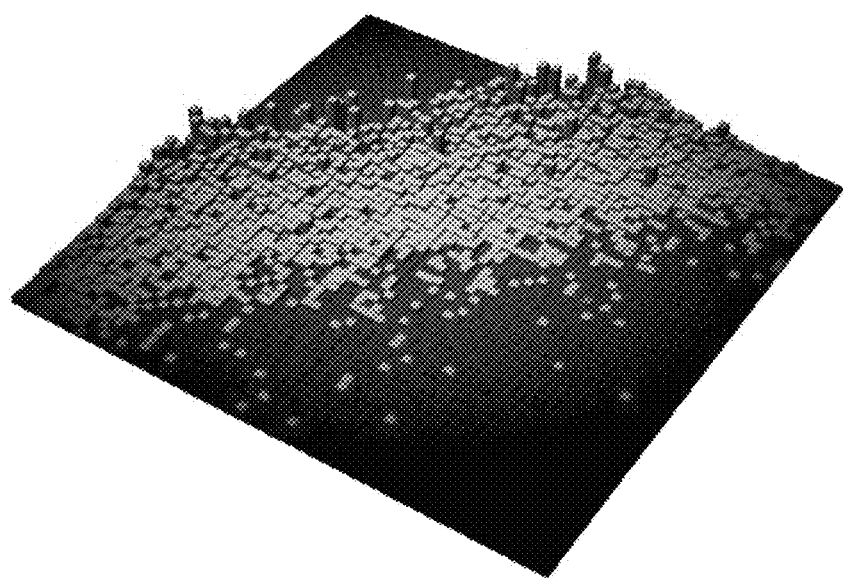
Figure 9H:
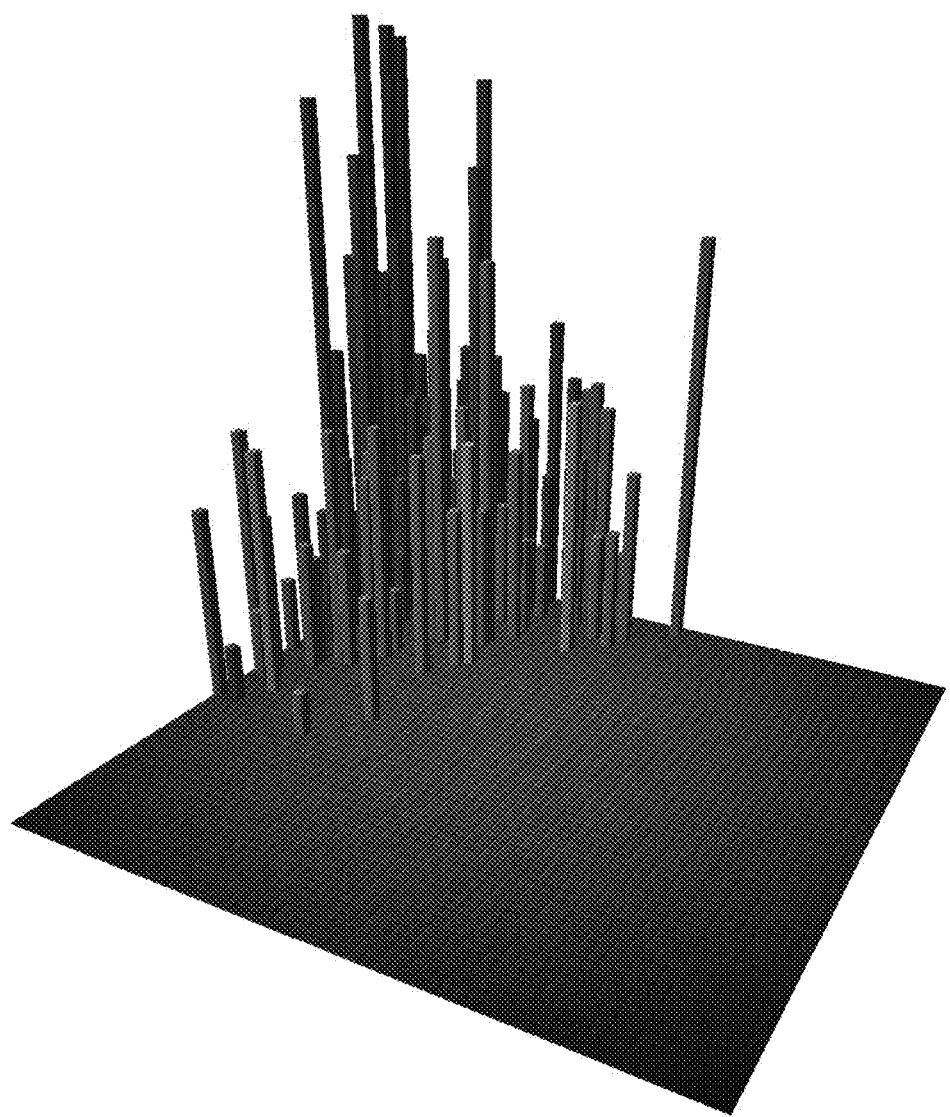
Figure 9L:
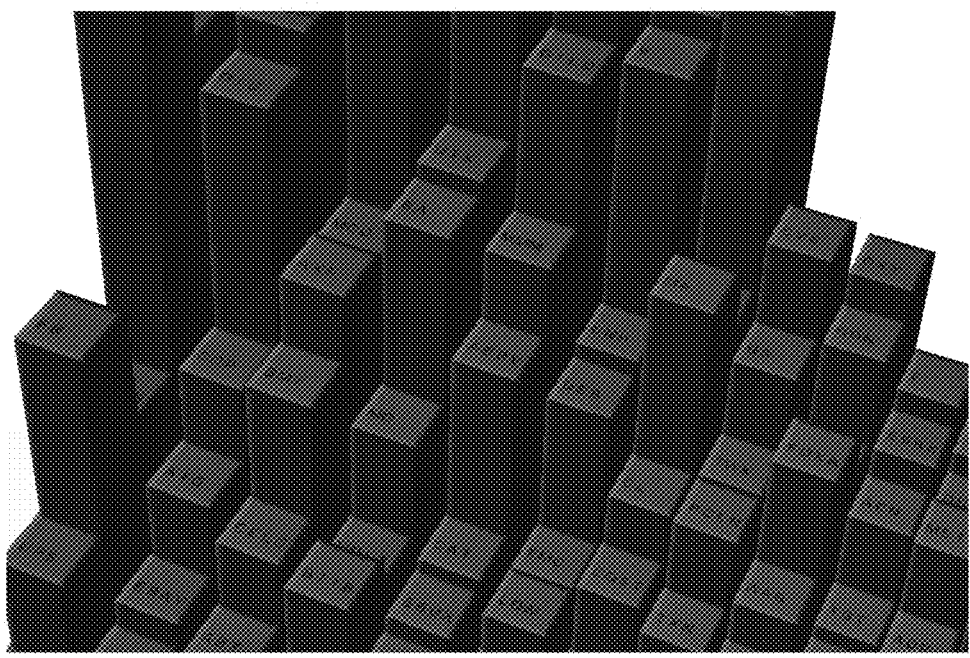

FIG. 9E-9H are enlarged views of additional Vanguard funds shown in FIG. 9A with the holding percentage value plotted in 3D, again, not weighted by market cap. Each holding is colored by market cap group in a manner similar to FIGS. 9A and 9C, namely, mega-cap (red), mid-cap (orange), small-cap (yellow), and micro-cap (light yellow). FIG. 9E is the Vanguard Mid-Cap Index fund. FIG. 9F is the Vanguard Mid-Cap Value Index Fund. FIG. 9G is the Vanguard Small-Cap Index fund, and FIG. 9H is the Vanguard Windsor fund.

FIG. 9I shows a magnified view of the Vanguard Total Stock Market fund, with each holding identified by a label of its respective stock ticker.

III. Positioning of Securities in a Grid

For each type of diversification visualization, a common positioning schema is used across investments so that valid comparisons can be made. The schema defines how underlying individual investments and underlying investment groups should be positioned. Two such schemas are defined as a linearly wrapping (FIG. 1C) and diagonal wrapping (FIG. 1D).

With linearly wrapping positioning shown in FIG. 1C, the largest company, as measured by market capitalization, is placed in the top left position. The next largest company is placed to the right, and so on, until the edge of the bounding area. When the edge of the bounding is reached, the next company is placed in the row beneath, starting at the leftmost position, similar to a carriage return position when typing.

With diagonal wrapping positioning shown in FIG. 1D, the largest company, as measured by market capitalization, is also placed in the top left position. Companies are then placed diagonally in descending order by market capitalization.

In addition to defining how underlying holdings and groups of holdings are positioned, the positioning schema can also define relative weighting by using rectangular area footprints that are proportional to each underlying holdings market capitalization share as defined by a broad market index (e.g., CRSP U.S. Broad Market Index). This visual layout is commonly referred to as a treemap. (FIG. 3 is an example of such a visual layout). Existing treemap algorithms can be used that calculate both position and area per underlying quantity. See, for example, the entry in Wikipedia for "Treemapping."

IV. Data Structure

FIG. 21 shows a sample data structure for use in preferred embodiments of the present invention. This data structure has four fields, namely, Unique Asset Name (e.g., holding name), weight in percentage (e.g., holding percentage), size (i.e., relative asset size, such as mega, mid or small) and type (e.g., growth, value).

V. Pseudocode

Sample pseudocode for generating cubes and holding grids, and finding the best compliment are provided below.

Figure 22:
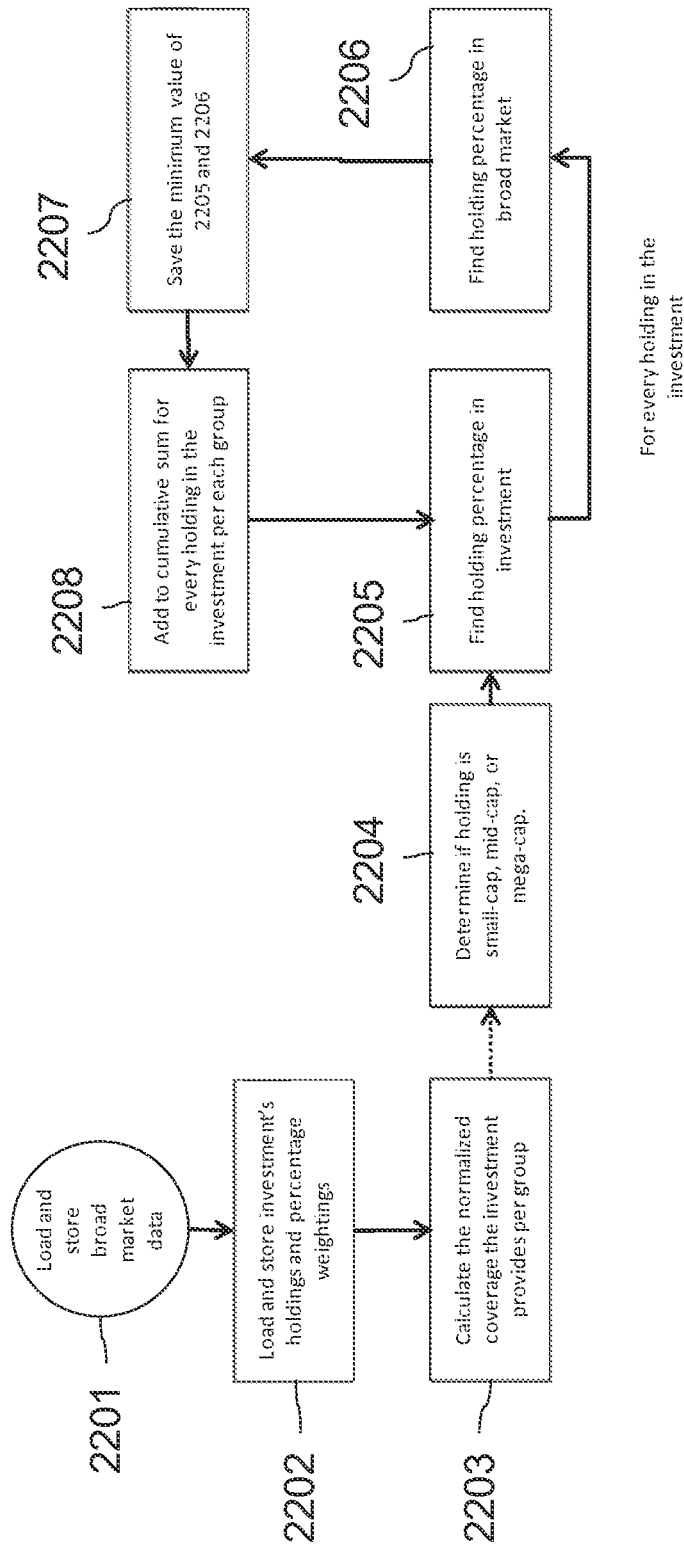
FIGS. 22-24 are flowcharts of selected algorithms for use in preferred embodiments of the present invention.

Method 1: Cube with Market Cap Segments (FIG. 22, Steps 2201-2210).

1. Load and store broad market holdings names and respective percentages in an array (step 2201).
2. Load and store market segment index holdings names and respective percentages in an array (step 2201).
3. Load and store the specific investment's holding names and respective percentages in an array (step 2202).
4. Calculate the normalized percentage of small-cap, mid-cap, and mega-cap holdings in the investment (step 2203).
   a. Loop through each holding in the investment (step 2203)
   b. For each holding, determine if the holding is small-cap, mid-cap, or mega-cap by referencing a market segment index (step 2204).
   c. For each holding, retrieve the holding percentage relative to the investment (step 2205)
   d. For each holding, retrieve the holding percentage relative to the broad market (step 2206)
   e. Comparing the respective values in steps c and d, save the minimum value of the two (step 2207)
   f. Sum the percentage of each holding in each group based on the values in step e—small-cap, mid-cap, mega-cap (step 2208).

Mathematical Detail for Method 1

Let $P_{ref}$ be a reference portfolio, e.g. total stock, consists of n groups of assets with weights $w_{ref,1}, w_{ref,2}, \ldots,$ and $w_{ref,n}$, where $w_{ref,1}+w_{ref,2}+ \ldots +w_{ref,n}=1$ and $w_{ref,i}>0$, for $1 \le i \le n$.

Let $P_{ref}$ be a portfolio consists of the same n groups of assets with weights $w_1, w_2, \ldots,$ and $w_n$, where $w_1+w_2+ \ldots +w_n=1$ and $w_i \ge 0$, for $1 \le i \le n$. (note $w_i$ can be zero)

The contributing weight, $w'_i$, of each asset is defined as:

$$w'_i = \min(w_{ref,i}, w_i)$$

Each asset can be further classified into one of different classes, such as mega-cap, mid-cap and small-cap, by referencing a market segment index. For a classification method that consists of Q classes, in which class j consists of assets $\{i_{j,1}, i_{j,2}, \ldots, i_{j,m_j}\}$, the total contributing weight $W'_j$ of class, j, is defined as $$W'_j = \sum_{k=1}^{m_j} w'_{i_{j,k}}$$

and the total contributing weight, $W_{ref,j}$ of class j in the reference portfolio is defined as $$W_{ref,j} = \sum_{k=1}^{m_j} w_{ref,i_{j,k}}$$

A unit square for this classification method is partitioned into Q rectangles, $R_1, R_2, \ldots,$ and $R_P$ with the area of $R_j$ is equal to $W_{ref,j}$, for $1 \le j \le Q$. Since the sum of the weights is 1, the total area of the rectangles is also equal to 1.

For each rectangle, $R_j$, a volume, $V_j$, is formed by extruding $R_j$ in the same direction perpendicular to $R_j$, for a height of $W'_j/W_{ref,j}$.

Therefore, the volume of $V_j$ is equal to $W'_j$.

1) If P is equal to $P_{ref}$, each volume $V_j$ has a height of 1, and a perfect cube is formed.

2) Since $0 \le W'_j \le W_{ref,j}$, the total volume is always less than or equal to 1.

Figure 23:
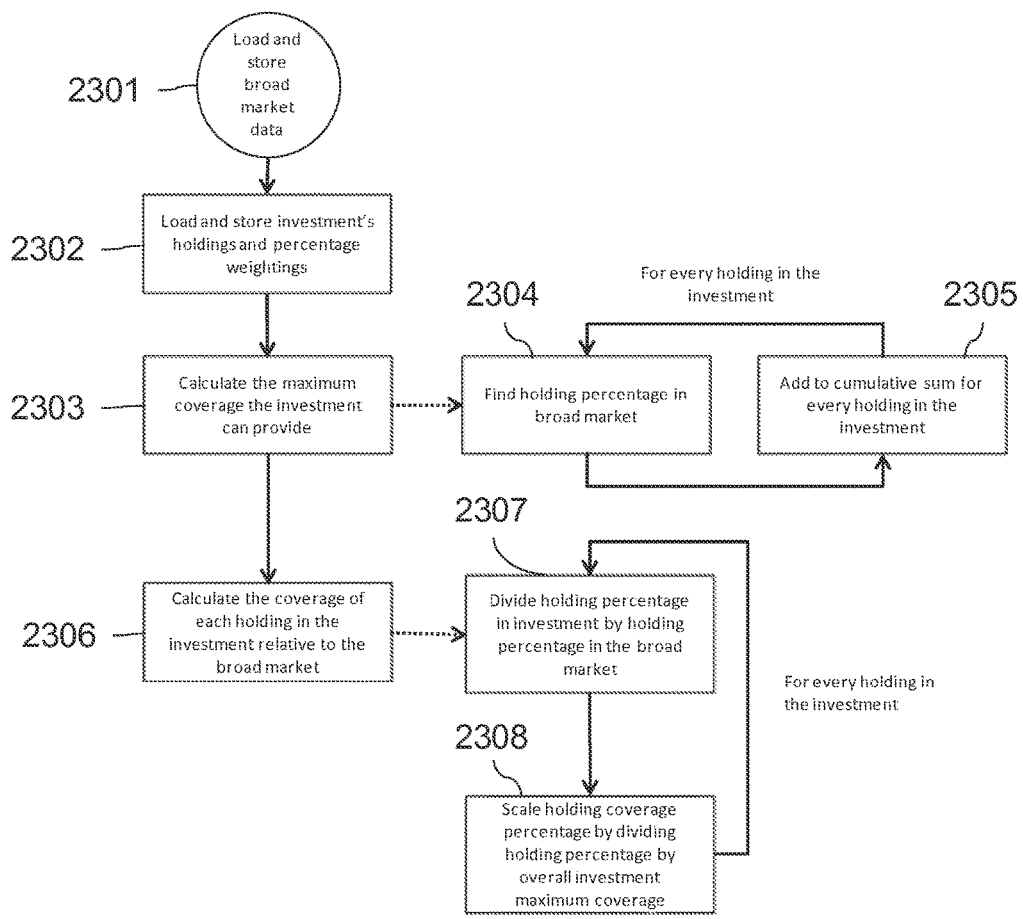

Method 2: Individual Holding Grid (FIG. 23, Steps 2301-2308)

1. Load and store broad market holdings names and respective percentages in an array (step 2301).
2. Load and store the specific investment's holding names and respective percentages in an array (step 2302).
3. Calculate the maximum coverage the investment can provide (step 2303)
   a. Loop through each holding in the investment
   b. Find the holding percentage in the broad market that corresponds to each holding in the investment (step 2304)
   c. Sum all the holding percentages in b (step 2305).
   d. For example, small-cap stocks represent 13% of the broad U.S. Stock Market. After completing step 4 calculation for Small Cap Index Fund, 13% would be the calculated value.
4. Calculate the coverage of each holding in the investment relative to the broad market (step 2306)
   a. Loop through each holding in the investment
   b. For each holding, divide the investment's holding percentage by the holding's market-cap weighted percentage in the broad market (step 2307)
   c. For example, if a fund has 9% of AAPL and AAPL represent 3% of the broad stock market, this fund would have an absolute overweighting of 3×.
5. Scale the holding coverage percentage in #4 relative to market cap coverage of the fund holdings by using the values derived in #4 by #3. Divide the value derived in #4 by the value derived in #3 (step 2308).

Find Best Complement

The system can find an investment that best fills the gap that a portfolio may have in its holdings relative to the broad market. The gap may results from a combination of factors including not having a holding or collection of holdings entirely or having an underweighted investment exposure to a holding or collection of holdings. The investment that best fills the gap can then be highlighted. See, for example, FIG. 17, described in more detail below.

Figure 24:
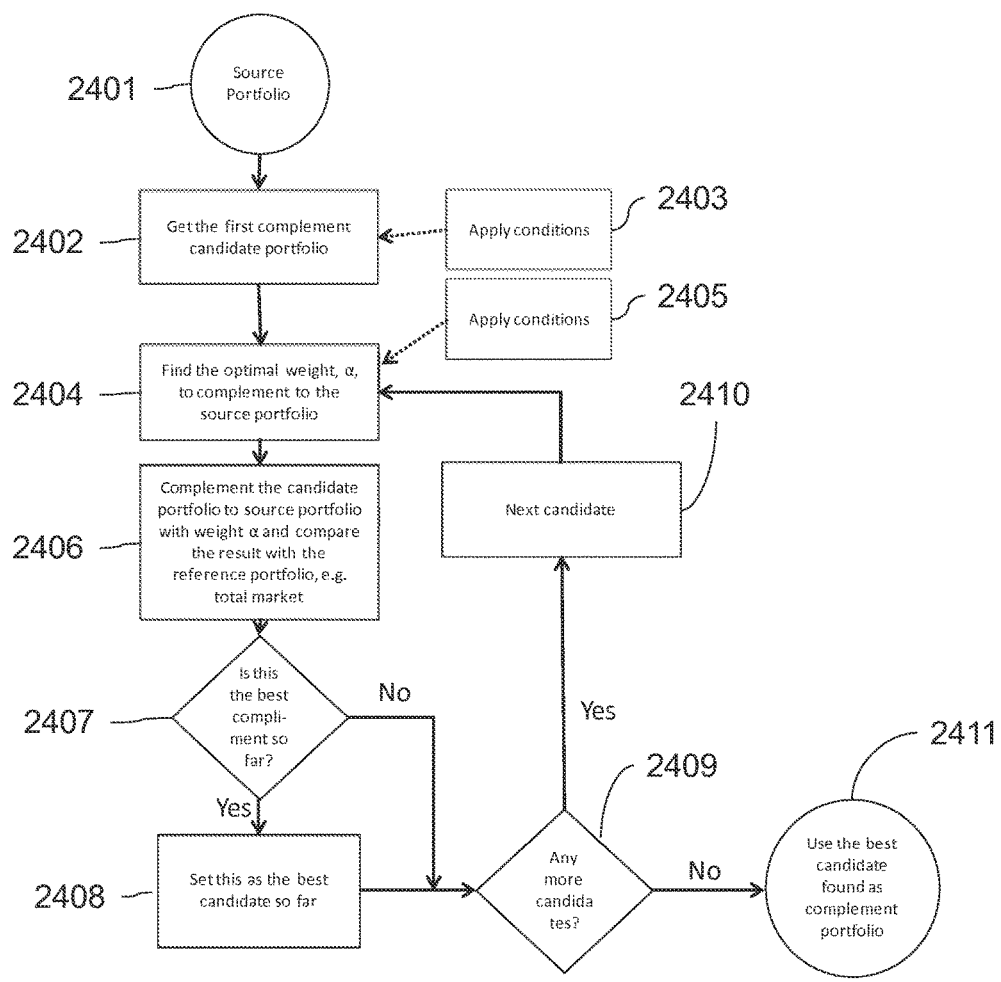

Method for Finding the Best Complement (FIG. 24, steps 2410-2409 The individual steps are embedded in the algorithms below, and thus are not individually identified.)

Conditions:

1. Only certain investments, such as index funds, may be eligible to be a complement (step 2403).
2. The original fund proportions must be maintained. If an investor owned 1× fund A, 2× fund B, and 3× fund C, those relative ratios must be maintained (step 2405).
3. There is a minimum amount (e.g., 20%) that must remain of each fund's original amount in the original portfolio. For example, if the minimum amount is set at 20% and if the portfolio had 10% of fund A, the minimum amount that the new portfolio can have of fund A is 2% (20% of 10%) (step 2405).
4. It is possible that no best compliment will be found—in which case the system will alert the user.

Inputs:

1) A reference portfolio, $p_{total}$, consists of n groups of assets with non-negative and non-zero weights, $w_{total,i}$ where $1 \le i \le n$ and $$\sum_{i=1}^{n} w_{total,i} = 1.$$

2) A portfolio, $p_{source}$, consists of same n groups of assets as $p_{total}$, with non-negative weights, $w_{source,i}$ where $1 \le i \le n$ and $$\sum_{i=1}^{n} w_{source,i} = 1.$$

3) A set of candidate portfolios, $P = \{p_1, p_2, \ldots, p_m\}$. Each portfolio, $p_j \in P$ consists of the same n groups of assets as $p_{total}$ with non-negative weights, $w_{j,i}$, where $1 \le i \le n$ and $$\sum_{i=1}^{n} w_{j,i} = 1.$$

Outputs:

1) A complement portfolio, $p_c$, is selected from P.
2) A weighting factor, $\alpha$, to complement $p_{source}$ with $p_c$. The complemented portfolio consists of the same n groups of assets with non-negative weights, $$w_i = \alpha \times w_{source,i} + (1 - \alpha) \times w_{c,i},$$

$$1 \le i \le n$$

and $$\sum_{i=1}^{n} w_i = 1.$$

Algorithm:

$$coverage_{source} = \sum_{i=1}^{n} w'_{source,i},$$

where $$w'_{source,i} = \begin{cases} w_{total,i}, & w_{source,i} > 0 \\ 0, & w_{source,i} = 0 \end{cases}$$

For each $p_j \in P$ $$coverage_j = \sum_{i=1}^{n} w'_{j,i},$$

where $$w'_{j,i} = \begin{cases} w_{total,i}, & w_{j,i} > 0 \\ 0, & w_{j,i} = 0 \end{cases}$$

$$overlapCoverage_j = \sum_{i=1}^{n} w''_{j,i},$$

where $$w''_{j,i} = \begin{cases} w_{total,i}, & w_{j,i} > 0 \text{ and } w_{source,i} > 0 \\ 0, & \text{else} \end{cases}$$

$$\alpha'_{j,1} = \frac{coverage_{source} - overlapCoverage_j}{(coverage_{source} - overlapCoverage_j) + (coverage_j - overlapCoverage_j)}$$

overlapSourceWeight$_j$=See equation in FIG. 27.

$$overlapCandidateWeight_j = \sum_{i=1}^{n} w'''_{j,i},$$

where $$w'''_{j,i} = \begin{cases} [(\min(w)]_{j,i}, w_{total,i}\}, & w_{j,i} > 0, w_{source,i} > 0 \\ 0, & \text{else} \end{cases}$$

$$\alpha'_{j,z} = \sum_{i=1}^{n} \alpha''_{j,i},$$

where $$\alpha''_{j,i} = \begin{cases} w_{total,i}, & w_{j,i} < w_{source,i} \\ 0, & \text{else} \end{cases}$$

$\alpha_j$=See equation in FIG. 28.

Creating a new portfolio, $p^i_j$ consists of n groups of assets with weights, $$w_i = \alpha_j \times w_{source,i} + (1 - \alpha_j) \times w_{j,i},$$

$$1 \leq i \leq n$$

and $$\sum_{i=1}^{n} w_i = 1.$$

Next $p_i$
Set output portfolio $p_c$ to $p_j$ where $p'_j$ has the minimum difference from $p_{total}$.
Set output $\alpha$ equal to $\alpha_j$, where $p'_j$ has the minimum difference from $p_{total}$.

VI. Example Fund Data Subset for Total Stock Market Fund. See FIG. 25

VII. Sample Hardware Disclosure

Figure 26:
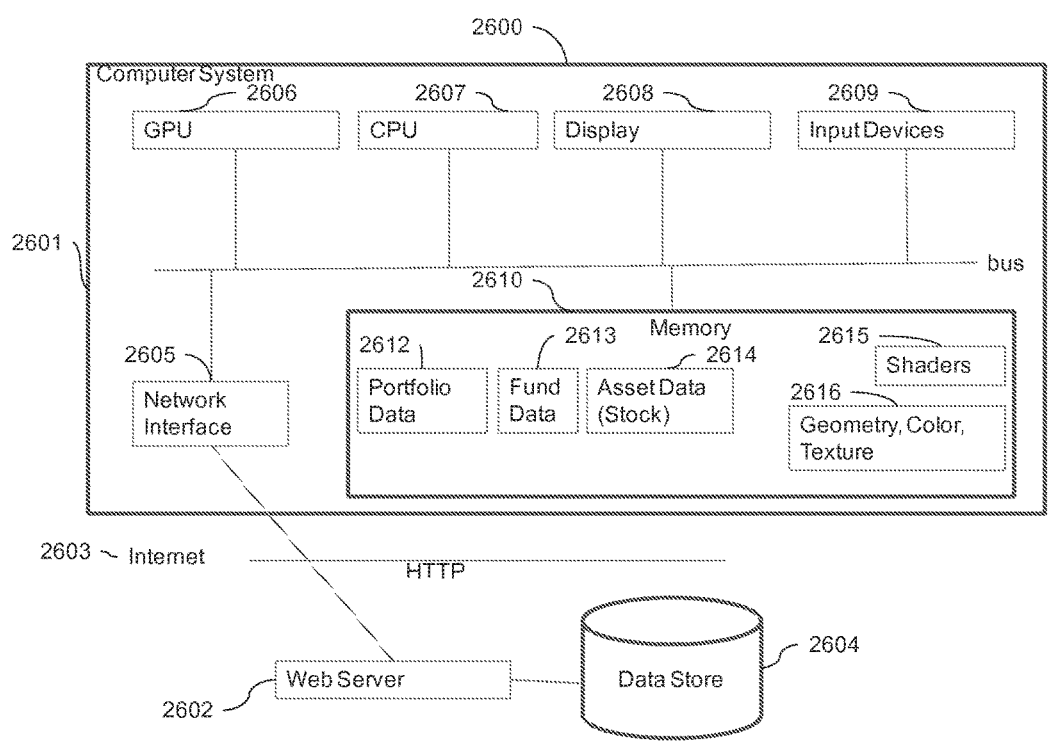
FIG. 26 is a schematic diagram of system components in accordance with preferred embodiments of the present invention.

FIG. 26 shows a schematic diagram 2600 of system components in accordance with preferred embodiment of the present invention. A computer system 2601 is connected to a web server 2602 via an electronic network, such as the Internet 2603. The web server 2602 is in communication with a data store 2604. The data store 2604 is a database containing all detailed information of portfolios, funds and assets. This application requests the essential data to calculate the diversification of each portfolio through the RESTful (representational state transfer) APIs (application programming interfaces) of the web server 2602. The web server 2602 then queries the essential information from the data store 2604 and packages them into formats such as JSON (JavaScript object notation) and XML (extensible markup language), and returns them to the application. The data store 2604 includes at least the following data:
 1) The weight and the key of each fund in a portfolio.
 2) The weight and the key of each asset invested in each fund.
 3) The keys (e.g. tickers) and the names of the assets.
 4) The types that each asset belongs to, such as stocks/bonds, mega-cap/mid-cap/small-cap/micro-cap, and growth/value.
 5) The weight and the key of each asset in the reference portfolio.

The computer system 2601 includes a network interface 2605 for communicating with the web server 2602 via the Internet 2603, a graphics processing unit or graphics processor (GPU) 2606, a central processing unit (CPU) 2607, a user interface display screen (display) 2608, input devices 2609 and memory 2610. The memory 2610 is connected to the other elements of the computer system 2601 via bus 2611. The memory 2610 includes portfolio data 2612, fund data 2613, asset data 2614 (e.g., stock data), shader elements (shaders) 2615 and geometry, color and texture elements 2616. The CPU 2607 is also referred to herein as a "processor."

One suitable set of system components is as follows:
 GPU: PowerVR G6430, NVIDIA GeForce
 CPU: Apple Cyclone, Intel Core i7
 Display: Apple Retina Display, 3D TV
 Input Devices: Apple Multi-Touch, Leap Motion
 Web Server: Apache Tomcat, Microsoft IIS The GPU 206 and the CPU 2607 perform the calculations and implement the algorithms and pseudocode shown in FIGS. 22-24 and described above.

Other system components which perform similar functionality as the ones listed above may be used instead of the listed ones.

VIII. Sample Uses for Visualization Tools

The visualization tools described herein have a large number of potential uses, some of which are described below.

Figure 10:
Figure 11:
Figure 12:
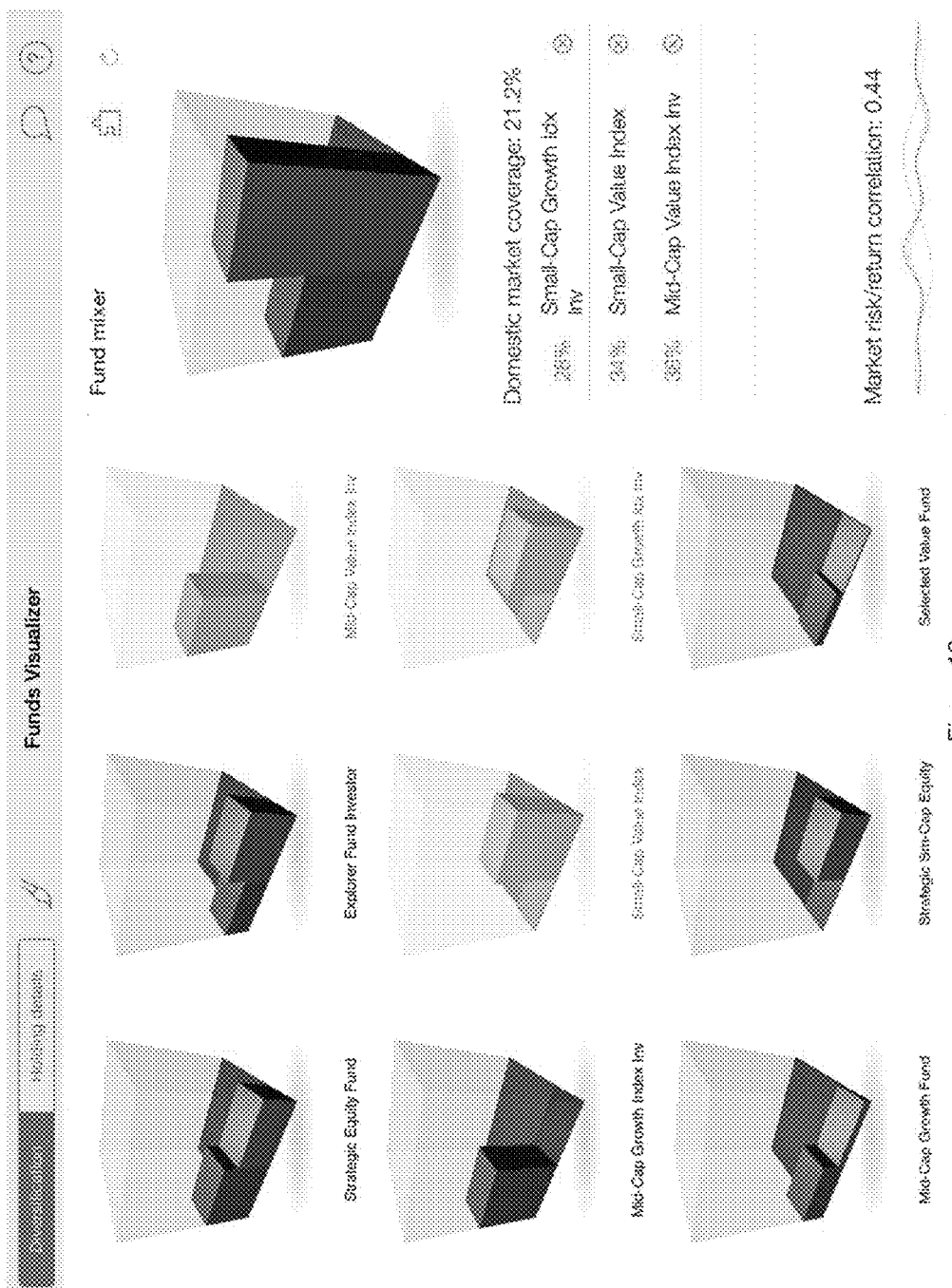
Figure 13:
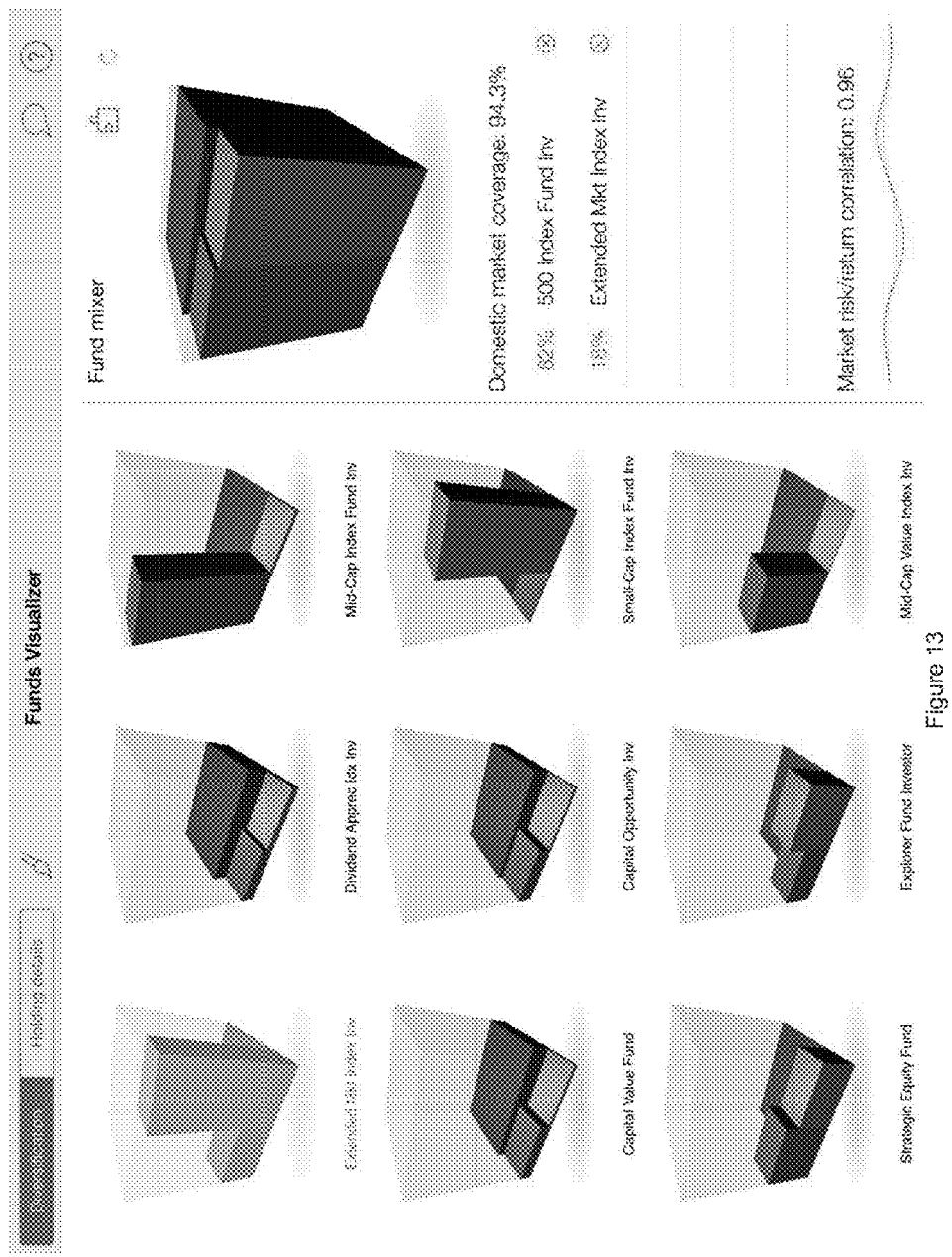
Figure 14:
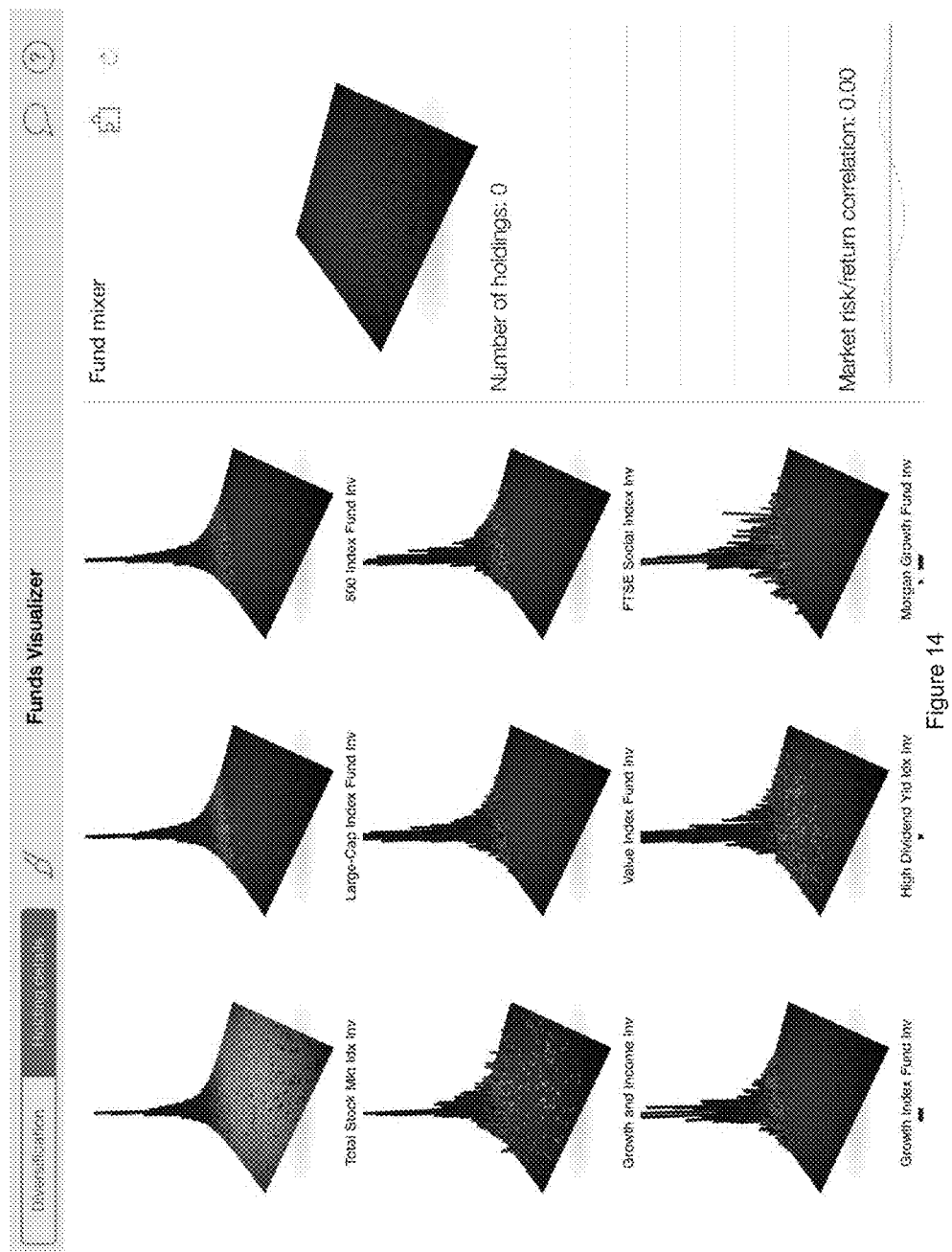
Figure 15:
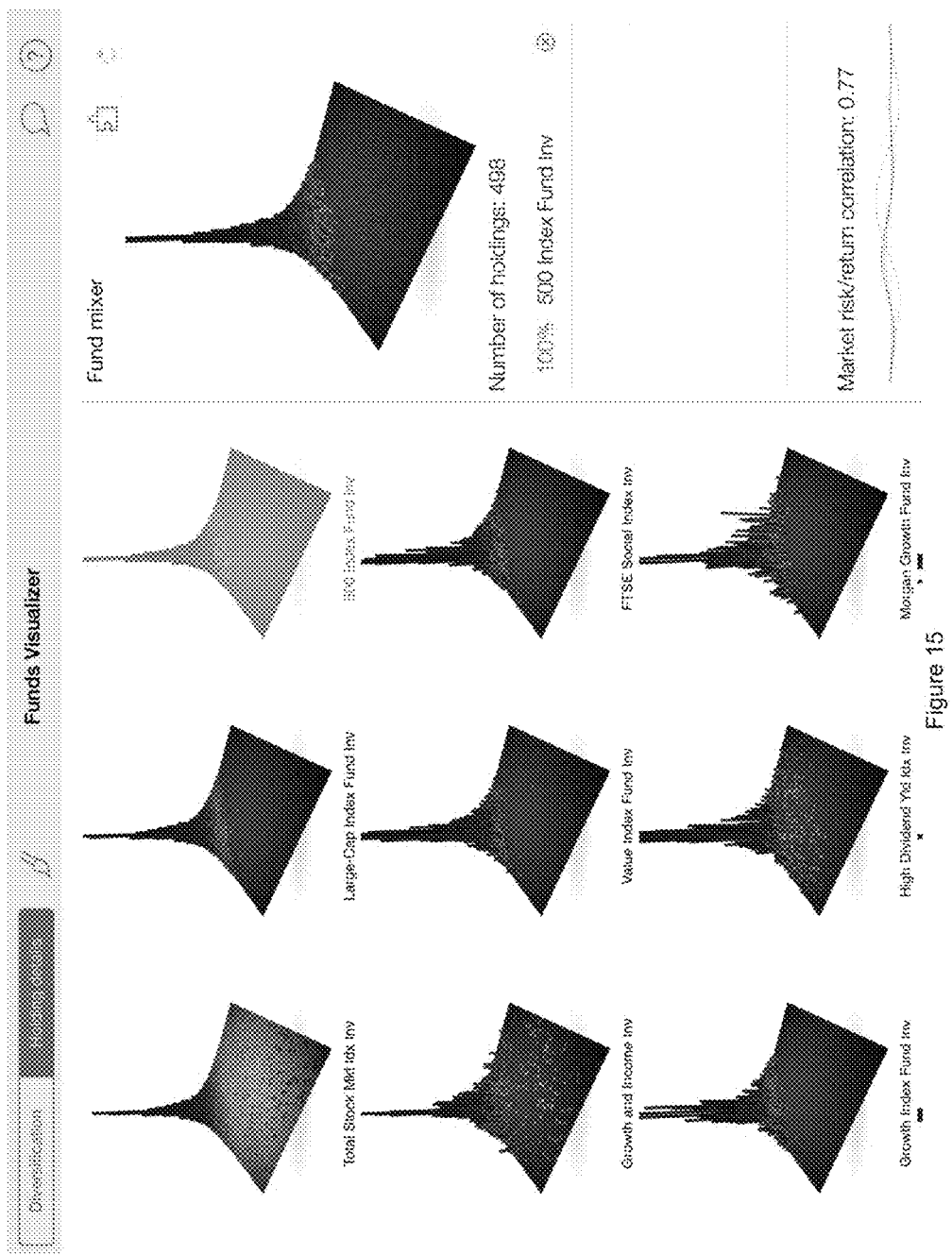
Figure 16:
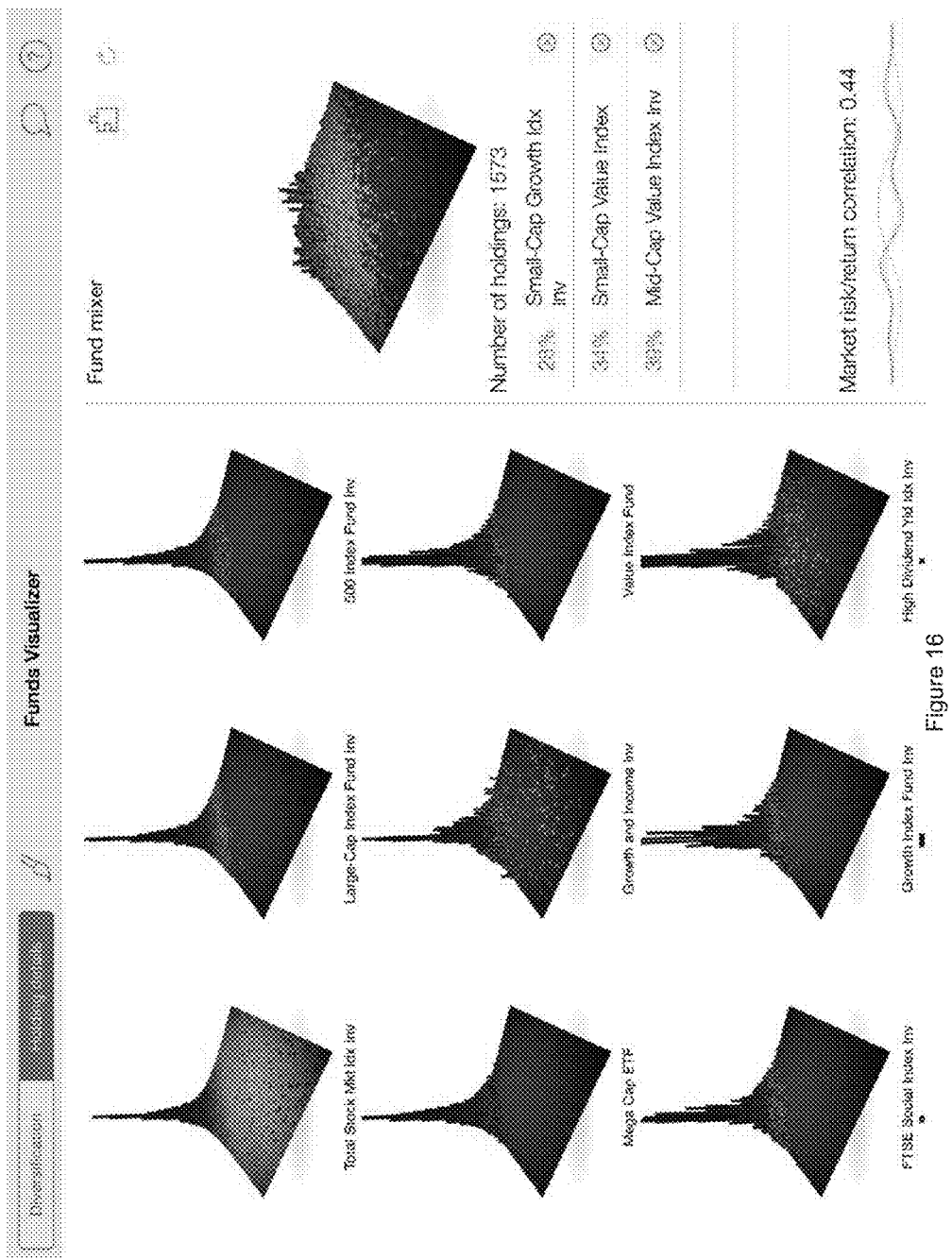
Figure 17:
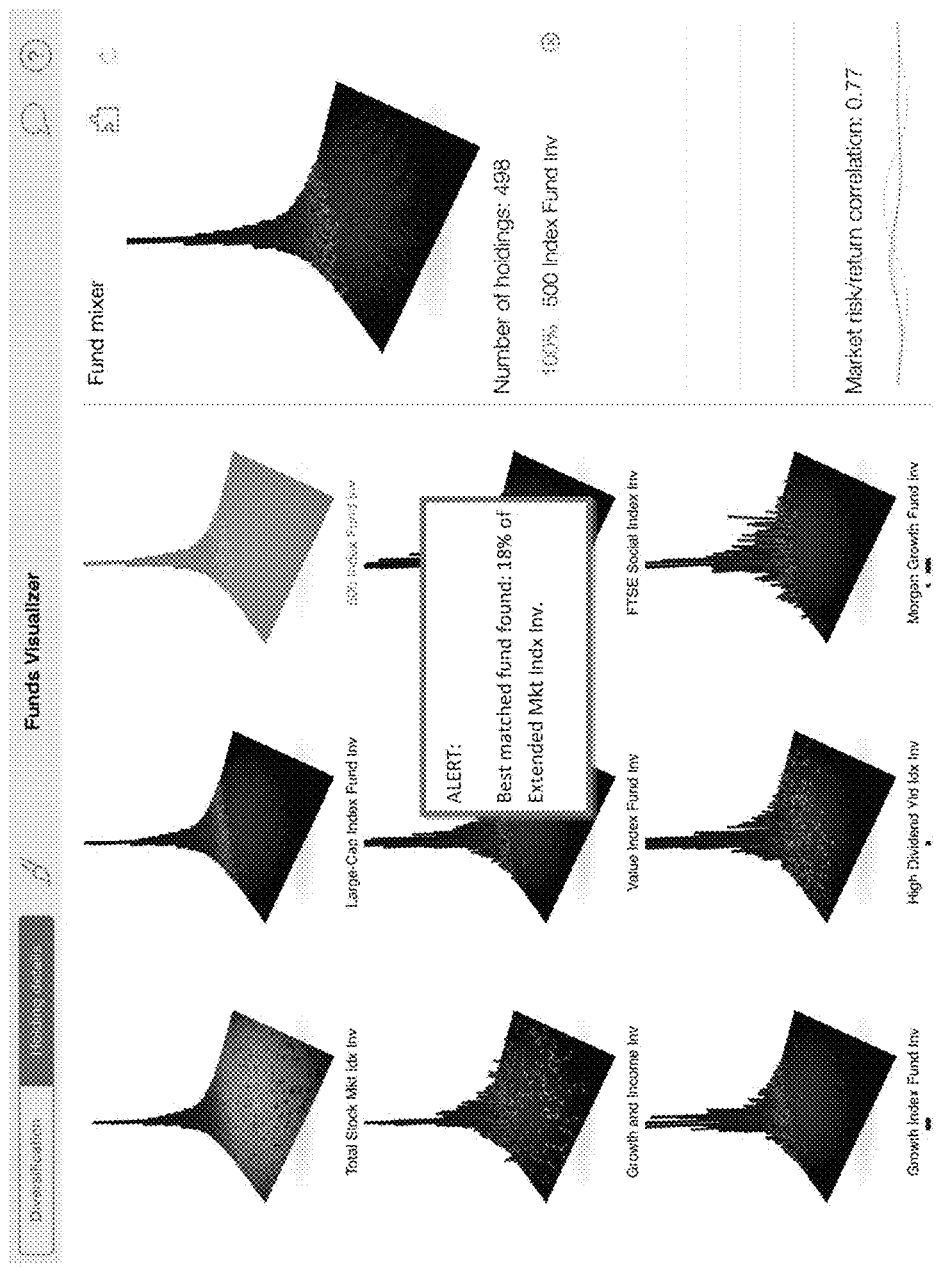
Figure 18:
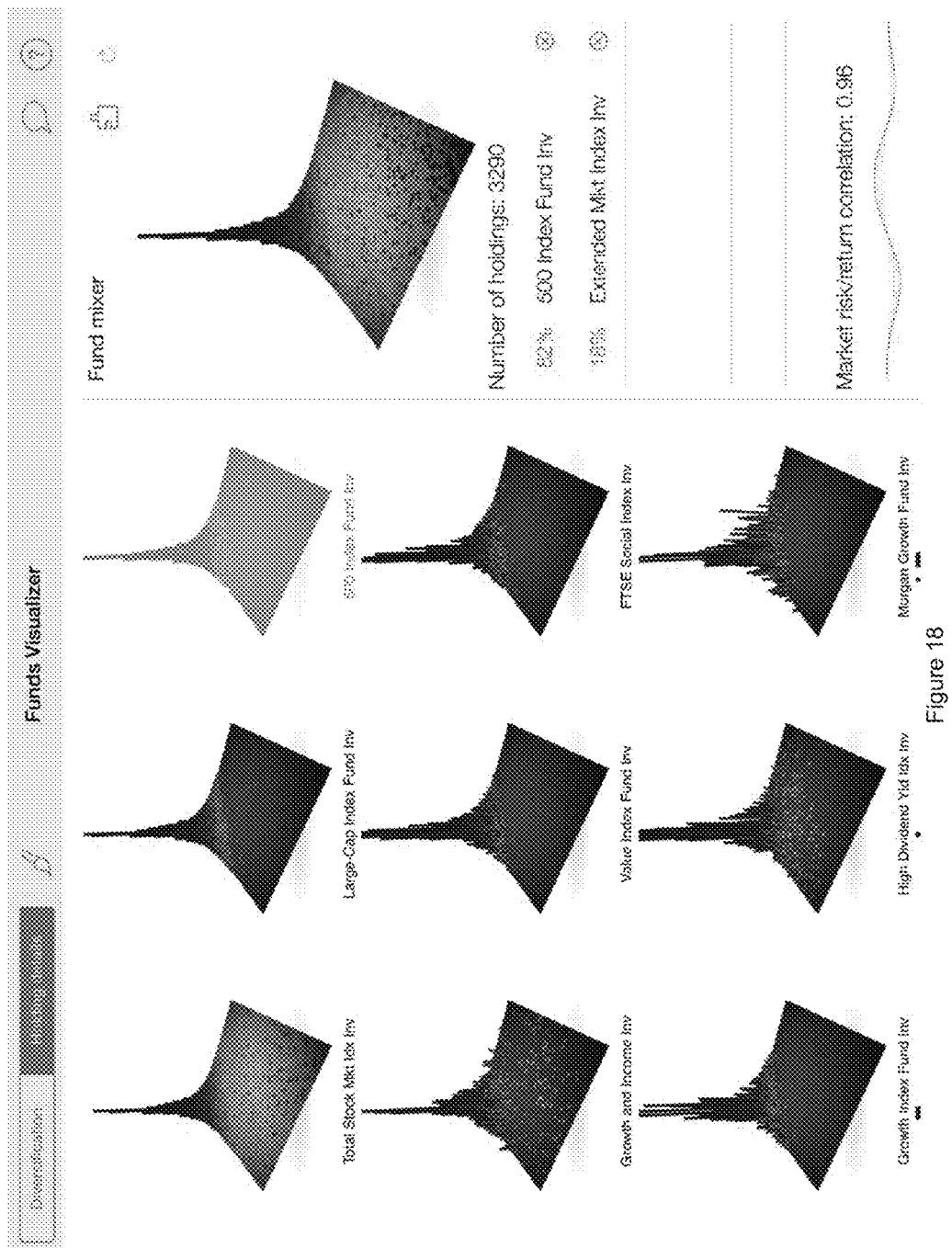
Figure 19A:
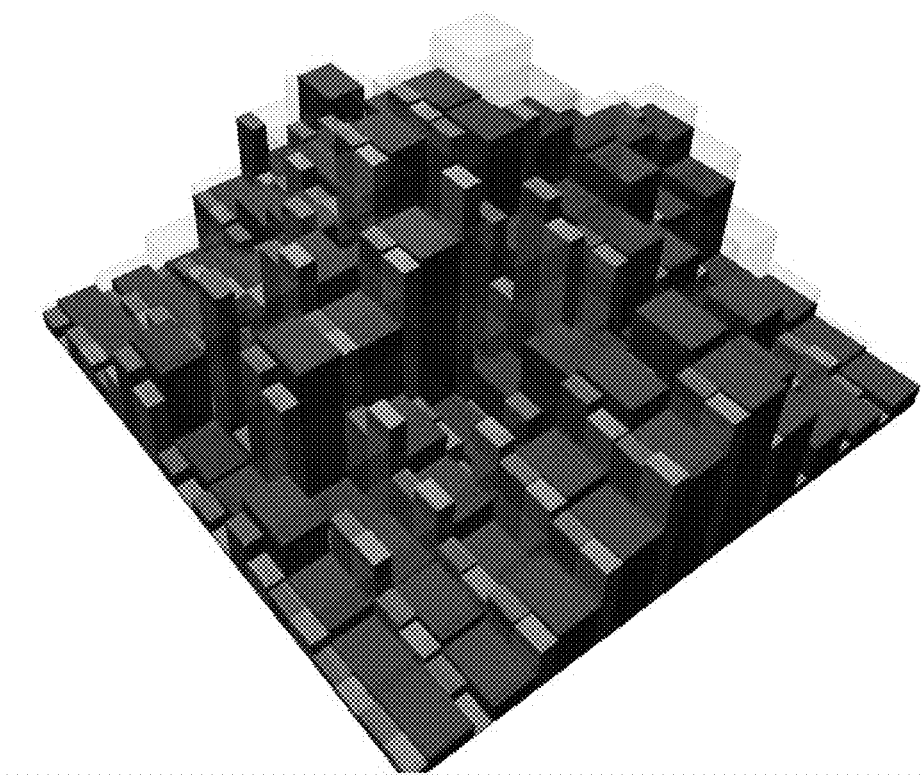
Figure 19B:
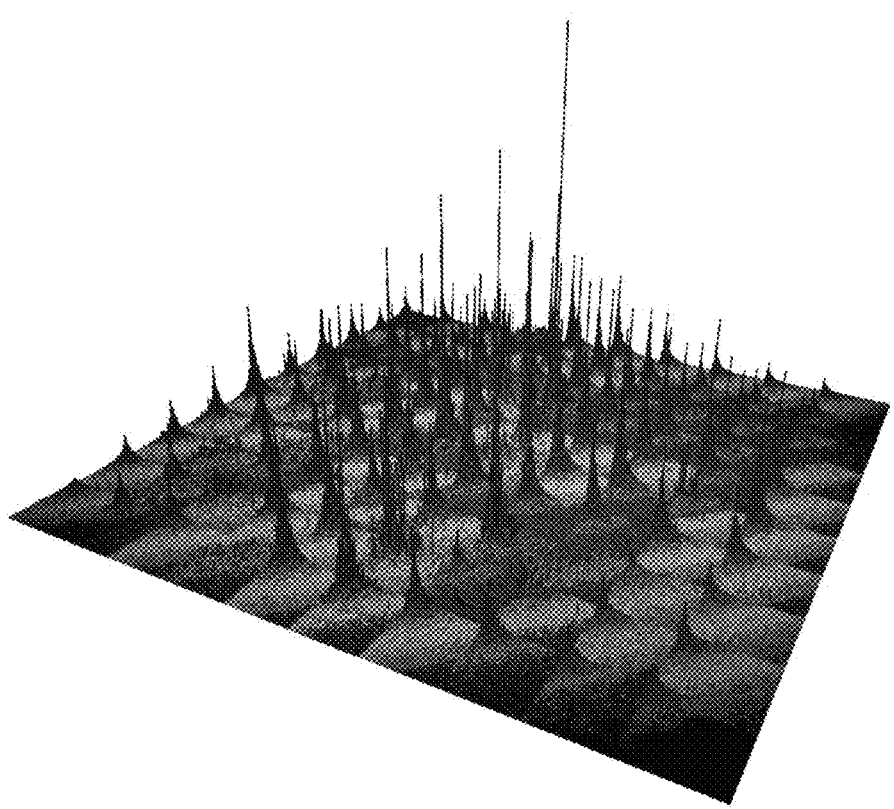
Figure 20A:
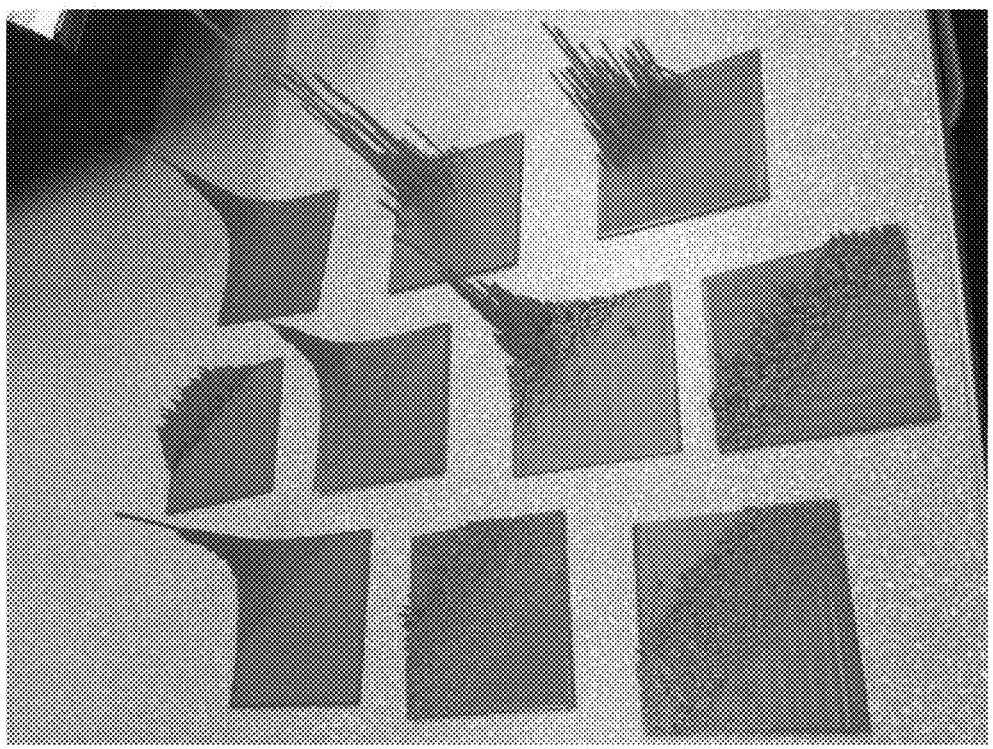
Figure 20B:
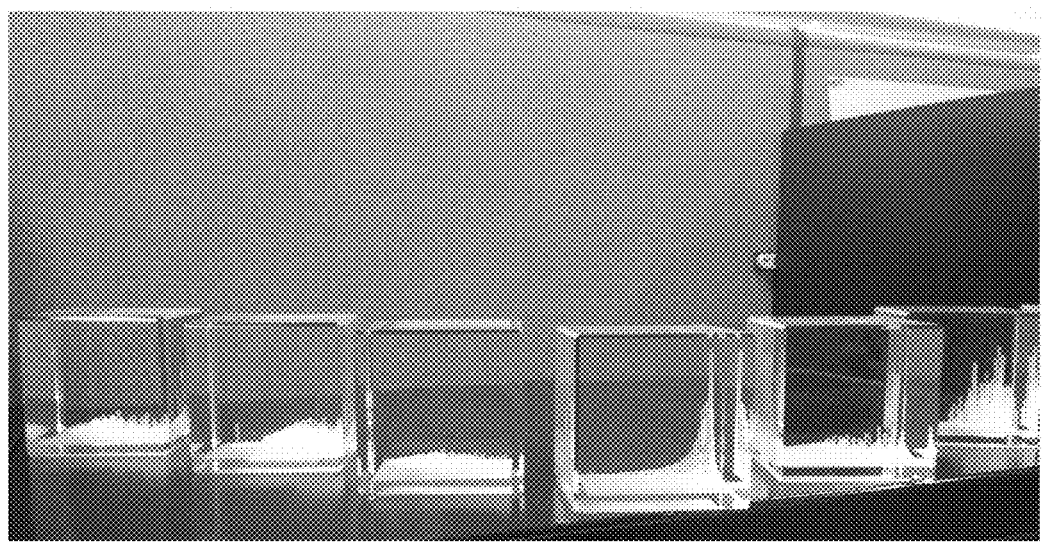

A. Overview of Sample Uses
  1. Diversification visualization for investments
     a. Individual holding diversification can viewed.
     b. Individual fund profile diversification can viewed.
     c. The diversification of a portfolio consisting of mutual funds, ETFS, and/or individual holdings (stocks and/or bonds) can be viewed.
  2. Drag-and-drop portfolio mixer
     Individual fund diversification visualizations and/or portfolio diversification visualizations can be dragged/dropped onto each other to dynamically model and visualize the diversification of the new combination. Investments can be added or removed from a portfolio. Amounts of the constituent investments can be modified.
  3. Fund recommender tool
     The best complement for an investment can be determined based on calculating which investment, selected from a target universe of eligible investments (funds or individual holdings), provides the most complete diversification in combination with the original investment. To initiate this process, the user taps or clicks on the puzzle icon shown in the mixing zone of FIGS. 10-18.
  4. Diversification visualization for investments across multiple investors. See FIGS. 19A and 19B.
     a. 401k plan sponsor flyovers
        401k plan sponsors can "flyover" their employees' 401K account portfolios, visualized in 3D, by absolute dollar value and diversification. The resulting portfolio "landscape" would be similar to a city with a cluster of skyscrapers (senior executives) and suburbs (new employees)
        The visual effect is similar to Google Earth 3D Tour wherein entire cities are completely modeled in 3D.
     b. Financial advisor flyovers
        Financial advisors can "flyover" their clients' portfolios, visualized in 3D, by absolute dollar value and diversification. The resulting portfolio "landscape" would be similar to a city such as those viewed in Google Earth 3D Tour.
  5. 3D printout of funds and portfolios
     Individual funds and/or portfolios can be printed as 3D models. Different individual fund 3D models and portfolio 3D models can be combined to illustrate how full diversification can be achieved. See FIGS. 20A and 20B.
B. Detailed Examples of Sample Uses
  FIGS. 10-13 show examples of the cube view wherein holdings are normalized. A subset of Vanguard funds are shown in a grid on the lefthand side of a user interface display. The funds are arranged on the lefthand side in the same order as shown in the name key of FIG. 9B. The righthand side of the display is a mixing zone which is used for viewing and mixing the funds.
  FIG. 10: Multiple stock funds can be viewed and mixed into portfolios. Views can be toggled between the diversification view (shown in FIG. 10) and the holding details view (shown in FIG. 14). The diversification view is indicated by the toolbar selection of the option "Diversification" and the holding details view is indicated by the toolbar selection of the option "Holding details." In FIG. 10, no fund has been selected yet, so the cube is empty.
  FIG. 11: Individual funds can be placed in the mixing zone by a drag-and-drop operation. Here, the Vanguard 500 Index Fund is placed in the mixing zone, and the resultant cube is illustrated. Text is also provided stating that domestic market coverage is 80.0%.
  FIG. 12: As multiple funds are added to the mixing zone by multiple drag-and-drop operations, the resulting aggregate diversification visualization is updated. The user can adjust the percentage weighting for each fund added. In the example of FIG. 12, 28% Small Cap Growth Index Fund, 34% Small Cap Value Index Fund, and 39% of Mid Cap Value Index fund are combined. Again, the resultant cube is illustrated and text is provided stating that the domestic market coverage is 20.4%.
  FIG. 13: Multiple funds can be combined that result in a portfolio that provides near complete diversification, as indicated when the cube is full. Here, a combination of 82% Vanguard 500 Index Fund and 18% Extended Market Index Fund results in domestic market coverage of 94.3%.
  FIGS. 14-17 show examples of the flyover view wherein holdings are Absolute (i.e., not market cap weighted).
  FIG. 14: No fund has been selected yet, so the landscape is flat.
  FIG. 15: Individual funds can be placed in the mixing zone. Here, the Vanguard 500 Index Fund is placed in the mixing zone by a drag-and-drop operation, and the resultant landscape is illustrated. Text is also provided stating that 498 holdings are in the investment. FIGS. 11 and 15 differ only in the selection of "Diversification" (FIG. 11) vs. "Holding details" (FIG. 15).
  FIG. 16: This is the equivalent figure to FIG. 12 to illustrate fund mixing using the "Holding details" view.
  FIG. 17: The best complement of a fund or collection of funds in the mixing zone can be programatically found by the system using the algorithms described above. In the example of FIG. 17, the 500 Index Fund was placed in the mixing zone and the Extended Market Fund was found to best compliment it in order to provide the best diversification coverage.
  FIG. 18: The resulting combination of the complement match applied from FIG. 17 is now shown in the mixing zone. FIGS. 13 and 18 differ only in the selection of "Diversification" (FIG. 13) vs. "Holding details" (FIG. 18).
  FIG. 19A illustrates diversification visualization for investments across multiple investors, grouped by holding segment. Proportions across holding segments (e.g., mega-cap, mid-cap, small-cap) for each investor are maintained. Heights are scaled to actual account balance of each investor.
  FIG. 19B illustrates diversification visualization for investments across multiple investors, displayed by individual holdings of investors' portfolio. Heights are scaled to actual account balance of each investor. FIGS. 19A and 19B may be useful for 401k plan sponsor flyovers.
  FIG. 20A shows ten mutual funds printed using 3D printing technology. Each holding is created in 3D with its height proportional to its holding weight percentage.
  FIG. 20B shows six mutual funds printed using 3D laser crystal etching technology. Each holding is etched in 3D with its height proportional to its holding weight percentage.
  To summarize, various types of portfolios may be handled by the system and process described above and illustrated in the figures. The portfolio may represent securities in an investment company, such as a specific fund within Vanguard. Alternatively, the portfolio may represent the securities in a plurality of investment companies, such as a combination of Vanguard funds (e.g., FIGS. 12 and 13). Alternatively, the portfolio may represent the securities in an investment portfolio of an individual investor.

The present invention may be implemented with any combination of hardware and software. If implemented as a computer-implemented apparatus, the present invention is implemented using means for performing all of the steps and functions described above.

When implemented in software, the software code for the servers can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of visualizing securities holdings in a first and a second portfolio, each holding being a security in a universe of securities, each security being assigned to one of a plurality of segments, the method comprising:
    (a) assigning the appropriate length and width dimensions of a rectangular area for each holding segment in the first and second portfolios based on the holding segment's market capitalization weight in the universe of securities;
    (b) for each holding segment in the first and second portfolios, electronically calculating using a processor the percentage of the holding segment relative to:
        (i) the cumulative market capitalization weight of all holdings in the holding segment of the first and second portfolios, and
        (ii) the cumulative market capitalization weight of all holdings in the holding segment of the first and second portfolios as measured by their respective cumulative market capitalization weight in the universe of securities;

(c) assigning the appropriate height for each holding segment in the first portfolio based on the calculations in step (b); and (d) electronically creating in a graphics processor:
(i) a first three-dimensional array of elements representing the first portfolio with the assigned length, width and height dimensions for each holding segment in the first portfolio, and
(ii) a second three-dimensional array of elements representing the second portfolio with the assigned length, width and height for each holding segment in the second portfolio;

(e) electronically displaying on a display:
(i) the first three-dimensional array of elements, and
(ii) the second three-dimensional array of elements; and (f) the processor receiving instructions that the second electronically displayed three-dimensional array of elements was dragged and dropped onto the first electronically displayed three-dimensional array of elements, wherein steps (a)-(e) are performed again for the combined holdings in the first and second portfolios upon receipt of the instructions, thereby creating a revised electronically displayed three-dimensional array of elements that reflects the combined holdings of the first and second portfolios, wherein the securities holdings of the first and second portfolio are maintained in a data store, and wherein the processor retrieves the securities holdings to perform its calculations via a server that is in communication with the data store through API's of the server.

2. The method of claim 1 wherein the holding segments include small cap, mid cap and large cap.

3. The method of claim 1 wherein the first portfolio and the second portfolio each represent the securities in an investment company.

4. The method of claim 1 wherein the first portfolio and the second portfolio each represent the securities in an investment portfolio of an individual investor.

5. The method of claim 1 wherein the first portfolio and the second portfolio each represent the securities in a plurality of investment companies.

6. The method of claim 1 wherein the universe of securities includes close to 1% of the cumulative full market capitalization of the U.S. equity universe.

7. The method of claim 1 wherein the maximum dimensions of the three-dimensional array of elements define a cube.

8. A method of visualizing securities holdings in a first and a second portfolio, each holding being a security in a universe of securities, each holding having a percentage value in the first and second portfolios, the method comprising:

(a) defining and storing in memory a three-dimensional array of elements, each element representing a security in the universe of securities, the securities having the largest market capitalization being in elements in the upper left of the array, the securities having the smallest market capitalization being in elements in the lower right of the array, and the securities between the largest and the smallest market capitalization being in elements trending from the upper left to the lower right of the array;

(b) electronically calculating using a processor the percentage value of each holding in the first and second portfolios and defining an element height for each holding in the first and second portfolios which is directly proportional to the percentage value, wherein the percentage value is not market cap weighted;

(c) electronically creating in a graphics processor:
(i) a first three-dimensional array of elements representing the first portfolio with the assigned height for each holding segment in the first portfolio, and
(ii) a second three-dimensional array of elements representing the second portfolio with the assigned height for each holding segment in the second portfolio;

(d) electronically displaying on a display:
(i) the first three-dimensional array of elements representing the first portfolio, wherein the holdings are represented and displayed in their respective elements by their respective calculated element heights, and wherein any securities in the universe of securities which are not in the first portfolio are represented and displayed by an element height of zero, and
(ii) the second three-dimensional array of elements representing the second portfolio, wherein the holdings are represented and displayed in their respective elements by their respective calculated element heights, and wherein any securities in the universe of securities which are not in the second portfolio are represented and displayed by an element height of zero; and (e) the processor receiving instructions that the second electronically displayed three-dimensional array of elements was dragged and dropped onto the first electronically displayed three-dimensional array of elements, wherein steps (b)-(d) are performed again for the combined holdings in the first and second portfolios upon receipt of the instructions, thereby creating a revised electronically displayed three-dimensional array of elements that reflects the combined holdings of the first and second portfolios, wherein the securities holdings of the first and second portfolio are maintained in a data store, and wherein the processor retrieves the securities holdings to perform its calculations via a server that is in communication with the data store through API's of the server.

9. The method of claim 8 wherein the first portfolio and the second portfolio each represent the securities in an investment company.

10. The method of claim 8 wherein the first portfolio and the second portfolio each represent the securities in an investment portfolio of an individual investor.

11. The method of claim 8 wherein the first portfolio and the second portfolio each represent the securities in a plurality of investment companies.

12. The method of claim 8 wherein the universe of securities includes close to 1% of the cumulative full market capitalization of the U.S. equity universe.

13. A method of visualizing securities holdings in a portfolio, each holding being a security in a universe of securities, each security being assigned to one of a plurality of segments, wherein an investment management company provides a plurality of investment companies, each investment company having a different investment strategy and having different holdings, the method comprising:

(a) assigning the appropriate length and width dimensions of a rectangular area for each holding segment in the portfolio based on the holding segment's market capitalization weight in the universe of securities;

(b) for each holding segment in the portfolio electronically calculating using a processor the percentage of the holding segment relative to:
(i) the cumulative market capitalization weight of all holdings in the holding segment of the portfolio, and (ii) the cumulative market capitalization weight of all holdings in the holding segment of the portfolio as measured by their respective cumulative market capitalization weight in the universe of securities;

(c) assigning the appropriate height for each holding segment in the portfolio based on the calculations in step (b); and (d) electronically creating in a graphics processor a three-dimensional array of elements with the assigned height for each holding segment in the portfolio;

(e) electronically displaying on a display the three-dimensional array of elements with the assigned length, width and height dimensions for each holding segment in the portfolio; and (f) electronically selecting an option to find a complement that would best fill the unfilled portion of the three-dimensional volume; and (g) electronically calculating using the processor which investment company or subset of the investment companies to add to the portfolio so as to best fill the unfilled portion, wherein the securities holdings of the portfolio are maintained in a data store, and wherein the processor retrieves the securities holdings to perform its calculations via a server that is in communication with the data store through API's of the server.

14. The method of claim 13 wherein the holding segments include small cap, mid cap and large cap.

15. The method of claim 13 wherein the portfolio represents the securities in an investment company.

16. The method of claim 13 wherein the portfolio represents the securities in an investment portfolio of an individual investor.

17. The method of claim 13 wherein the portfolio represents the securities in a plurality of investment companies.

18. The method of claim 13 wherein the universe of securities includes close to 1% of the cumulative full market capitalization of the U.S. equity universe.

* * * * *